US012712094B2

(12) United States Patent
Blumenthal et al.

(10) Patent No.: US 12,712,094 B2
(45) Date of Patent: Aug. 18, 2026

(54) PHOTONIC INTEGRATED BEAMLINES FOR 3D MAGNETO-OPTICAL TRAP

(71) Applicant: The Regents of the University of California, Oakland, CA (US)

(72) Inventors: Daniel J. Blumenthal, Santa Barbara, CA (US); Nitesh Chauhan, Sunnyvale, CA (US); Andrei Isichenko, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 343 days.

(21) Appl. No.: 18/542,341

(22) Filed: Dec. 15, 2023

(65) Prior Publication Data

US 2024/0203616 A1 Jun. 20, 2024

Related U.S. Application Data

(60) Provisional application No. 63/387,662, filed on Dec. 15, 2022.

(51) Int. Cl.
*G21K 1/20* (2026.01)

(52) U.S. Cl.
CPC .................................... *G21K 1/20* (2026.01)

(58) Field of Classification Search
CPC ........................................................ G21K 1/20
USPC ...................................................... 250/505.1
See application file for complete search history.

(56) References Cited

U.S. PATENT DOCUMENTS

| | | | |
|---|---|---|---|
| 11,402,241 | B2 | 8/2022 | Hoyt et al. |
| 2004/0202430 | A1 | 10/2004 | Scheuer et al. |
| 2022/0050356 | A1 | 2/2022 | Kippenberg et al. |
| 2022/0278497 | A1 | 9/2022 | Ahn et al. |
| 2023/0145261 | A1 | 5/2023 | Handanhal Ramachandra et al. |
| 2024/0184041 | A1 * | 6/2024 | Blumenthal ......... G02B 6/1225 |
| 2024/0210625 | A1 | 6/2024 | Bose et al. |
| 2024/0255751 | A1 | 8/2024 | Blumenthal et al. |

(Continued)

FOREIGN PATENT DOCUMENTS

| | | | |
|---|---|---|---|
| CN | 110515290 | A | 11/2019 |
| KR | 20110030213 | A | 3/2011 |
| WO | 2022188990 | A1 | 9/2022 |

OTHER PUBLICATIONS

Liu et al., "High-Density and High-Efficiency Silicon Photonics Optical Interconnects for Space Division Multiplexing with Multi-Core Fiber", Conference on Lasers and Electro-Optics Technical Digest Series (Optica Publishing Group), 2022, 2 pgs., doi: 10.1364/CLEO_SI.2022.STh4N.3.

(Continued)

*Primary Examiner* — Michael Maskell
(74) *Attorney, Agent, or Firm* — KPPB LLP

(57) ABSTRACT

A device may include an atomic cell with a first wall. A device may include a photonic integrated circuit positioned parallel to the atomic cell first wall, the photonic integrated circuit comprising: a set of three grating emitters mounted on the photonic integrated circuit around a circumference with a spacing of around 120 degrees, wherein each grating emitter is etched to emit free-space beams on to the first wall of the atomic cell at a selected angle, wherein the selected angle in combination with the circumference results in the set of free-space beams intersecting at a location inside the atomic cell.

20 Claims, 12 Drawing Sheets

(56) References Cited

U.S. PATENT DOCUMENTS

2024/0337791 A1 10/2024 Blumenthal et al.

OTHER PUBLICATIONS

Liu et al., "High-yield, wafer-scale fabrication of ultralow-loss, dispersion-engineered silicon nitride photonic circuits", Nature Communications, vol. 12, Article 2236, Apr. 16, 2021, 9 pgs., doi: 10.1038/s41467-021-21973-z.
Liu et al., "Monolithic piezoelectric control of soliton microcombs", Nature, vol. 583, No. 7816, Jul. 16, 2020, pp. 385-390, doi: 10.1038/s41586-020-2465-8.
Liu et al., "Photonic circuits for laser stabilization with ultra-low-loss and nonlinear resonators", arXiv:2107.03595v1, Jul. 8, 2021, 21 pgs.
Liu et al., "Photonic integrated cascade-inhibited Brillouin laser with sub-100-mHz fundamental linewidth", Conference on Lasers and Electro-Optics, Technical Digest Series (Optica Publishing Group), 2022, 2 pgs., doi: 10.1364/CLEO_SI.2022.SF2K.1.
Liu et al., "Semiconductor laser stabilized by a photonic integrated 4 meter coil-waveguide resonator", Optical Fiber Communications Conference and Exhibition (OFC), 2022, 3 pgs., doi: 10.1364/OFC.2022.Tu3D.2.
Liu et al., "Ultralow 0.034 dB/m loss wafer-scale integrated photonics realizing 720 million Q and 380 μW threshold Brillouin lasing", Optics Letters, vol. 47, No. 7, Apr. 1, 2022, pp. 1855-1858, doi: 10.1364/OL.454392.
Loh et al., "A microrod-resonator Brillouin laser with 240 Hz absolute linewidth", New Journal of physics, vol. 18, No. 045001, Apr. 4, 2016, 9 pgs., doi: 10.1088/1367-2630/18/4/045001.
Loh et al., "Dual-microcavity narrow-linewidth Brillouin laser", Optica, vol. 2, No. 3, Mar. 5, 2015, pp. 225-232, doi: 10.1364/OPTICA.2.000225.
Loh et al., "Operation of an optical atomic clock with a Brillouin laser subsystem", Nature, vol. 588, No. 7837, Dec. 9, 2020, pp. 244-249, doi: 10.1038/s41586-020-2981-6.
Loh et al., "Ultra-narrow linewidth Brillouin laser with nanokelvin temperature self-referencing", Optica, vol. 6, No. 2, Jan. 31, 2019, pp. 152-159, doi: 10.1364/OPTICA.6.000152.
Lu et al., "A Narrow-Linewidth On-Chip Toroid Raman Laser", IEEE Journal of Quantum Electronics, vol. 47, No. 3, Mar. 2011, pp. 320-326, doi: 10.1109/JQE.2010.2087742.
Ludlow et al., "Optical atomic clocks", Reviews of Modern Physics, vol. 87, No. 2, Apr.-Jun. 2015, pp. 637-701, doi: 10.1103/RevModPhys.87.637.
Lundberg et al., "Phase-coherent lightwave communications with frequency combs", Nature Communications, vol. 11, Article 201, Jan. 10, 2020, 7 pgs., doi: 10.1038/s41467-019-14010-7.
Ma et al., "Delivering the same optical frequency at two places: accurate cancellation of phase noise introduced by an optical fiber or other time-varying path", Optics Letters, vol. 19, No. 21, Nov. 1, 1994, pp. 1777-1779, doi: 10.1364/OL.19.001777.
Magden et al., "Laser Frequency Stabilization Using Pound-Drever-Hall Technique with an Integrated TiO2 Athermal Resonator", Conference on Lasers and Electro-Optics (CLEO), paper STu1H.3, Jun. 5-10, 2016, 2 pgs., doi: 10.1364/CLEO_SI.2016.STu1H.3.
Mahajan et al., "Co-Packaged Photonics for High Performance Computing: Status, Challenges and Opportunities", Journal of Lightwave Technology, vol. 40, No. 2, Jan. 15, 2022, pp. 379-392, doi: 10.1109/jlt.2021.3104725.
Manipatruni et al., "Wide temperature range operation of micrometer-scale silicon electro-optic modulators", Optics Letters, vol. 33, No. 19, Oct. 1, 2008, pp. 2185-2187, doi: 10.1364/OL.33.002185.
Marin-Palomo et al., "Microresonator-based solitons for massively parallel coherent optical communications", Nature, vol. 546, Jun. 8, 2017, pp. 274-279, doi: 10.1038/nature22387.
Marpaung et al., "Integrated microwave photonics", Laser & Photonic Reviews, vol. 7, No. 4, Jul. 2013, pp. 506-538, doi: 10.1002/lpor.201200032.
Marpaung et al., "Integrated microwave photonics", Nature Photonics, vol. 13, Feb. 2019, pp. 80-90, doi: 10.1038/s41566-018-0310-5.
Matei et al., "1.5 μm lasers with sub-10 mHz Linewidth", Physical Review Letter, vol. 118, Jun. 28, 2017, pp. 263202-1-263202-6, doi: 10.1103/PhysRevLett.118.263202.
Matsko et al., "Whispering-gallery-mode resonators as frequency references. I. Fundamental limitations", Journal of the Optical Society of America B, vol. 24, No. 6, Jun. 2007, pp. 1324-1335, doi: 10.1364/JOSAB.24.001324.
Matsuda et al., "Low-Noise Characteristics on 1.3-mum-Wavelength Quantum-Dot DFB Lasers under External Optical Feedback", IEEE International Semiconductor Laser Conference (ISLC), 2018, pp. 111-112, doi: 10.1109/ISLC.2018.8516191.
Maurya et al., "Recent Developments in R.F. Magnetron Sputtered Thin Films for pH Sensing Applications—An Overview", Coatings, vol. 4, No. 4, Dec. 1, 2014, pp. 756-771, doi: 10.3390/coatings4040756.
Mazzalai et al., "Characterization and Fatigue of the Converse Piezoelectric Effect in PZT Films for MEMS Applications", Journal of Microelectromechanical Systems, vol. 24, No. 4, Aug. 2015, pp. 831-838, doi: 10.1109/JMEMS.2014.2353855.
McGehee et al., "Magneto-optical trapping using planar optics", New Journal of Physics, vol. 23, No. 013021, Jan. 29, 2021, 9 pgs., doi: 10.1088/1367-2630/abdce3.
Meyer et al., "Assessment of Rydberg atoms for wideband electric field sensing", Journal of Physics B: Atomic, Molecular and Optical Physics, vol. 53, No. 3, Article 034001, 2020, 12 pgs., doi: 10.1088/1361-6455/ab6051.
Miller et al., "Electro-optic effect in silicon nitride", Conference on Lasers and Electro-Optics (CLEO), paper SF1G.4, 2015, 2 pgs., doi: 10.1364/CLEO_SI.2015.SF1G.4.
Mills, "The Cloud Begins with Coal", Digital Power Group, Retrieved from Internet: <https://www.tech-pundit.com/wp-content/uploads/2013/07/Cloud_Begins_With_Coal.pdf?c761ac&c761ac>, Retreived on Aug. 27, 2025, 44 pgs.
Miri et al., "Optical Nonreciprocity Based on Optomechanical Coupling", Physical Review Applied, vol. 7, Article 064014, Jun. 12, 2017, pp. 064014-1-064014-20, doi: 10.1103/PhysRevApplied.7.064014.
Mitchell et al., "Highly selective and vertical etch of silicon dioxide using ruthenium films as an etch mask", Journal of Vacuum Science and Technology A, vol. 39, No. 4, Jul./Aug. 2021, pp. 043204-1-043204-12, doi: 10.1116/6.0001030.
Mooradian, "Laser Linewidth", Physics Today, vol. 38, No. 5, May 1985, pp. 42-48, doi: 10.1063/1.880973.
Moreira et al., "Optical Interconnect for 3D Integration of Ultra-Low Loss Planar Lightwave Circuits", Advanced Photonics, OSA Technical Digest (online) (Optica Publishing Group), 2013, 3 pgs., doi: 10.1364/iprsn.2013.it2a.4.
Morsy-Osman et al., "DSP-free 'coherent-lite' transceiver for next generation single wavelength optical intra-datacenter interconnects", Optics Express vol. 26, No. 7, Apr. 2, 2018, pp. 8890-8903, doi: 10.1364/OE.26.008890.
Morton et al., "High-Power, Ultra-Low Noise Hybrid Lasers for Microwave Photonics and Optical Sensing", Journal of Lightwave Technology, vol. 36, No. 21, Mar. 19, 2018, pp. 5048-5057, doi: 10.1109/JLT.2018.2817175.
Morton et al., "Ultra Low Phase Noise, High Power, Hybrid Lasers for RF Mixing and Optical Sensing Applications", IEEE Avionics and Vehicle Fiber-Optics and Photonics Conference (AVFOP), 2017, 2 pgs., doi: 10.1109/AVFOP.2017.8169763.
Nakazawa et al., "Extremely Higher-Order Modulation Formats", Optical Fiber Telecommunications VIB, Chapter 7, May 13, 2013, pp. 297-336, doi: 10.1016/B978-0-12-396960-6.00007-9.
Nazarathy et al., "Spectral Analysis of Optical Mixing Measurements", Journal of Lightwave Technology, vol. 7, No. 7, Jul. 1989, pp. 1083-1096, doi: 10.1109/50.29635.
Newman et al., "Architecture for the photonic integration of an optical atomic clock", Optica, vol. 6, No. 5, May 2019, pp. 680-685, doi: 10.1364/OPTICA.6.000680.
Nguyen et al., "Large piezoelectric strain with ultra-low strain hysteresis in highly c-axis oriented Pb(Zr0.52Ti0.48)O3 films with

(56) References Cited

OTHER PUBLICATIONS columnar growth on amorphous glass substrates", Scientific Reports, vol. 7, No. 1, Article 12915, Published Online Oct. 10, 2017, 9 pgs., doi: 10.1038/s41598-017-13425-w.
Nicati et al., "Frequency Stability of a Brillouin Fiber Ring Laser", Journal of Lightwave Technology, vol. 13, No. 7, Jul. 1995, pp. 1445-1451, doi: 10.1109/50.400710.
Nicholes et al., "An 8x8 InP Monolithic Tunable Optical Router (MOTOR) Packet Forwarding Chip", Journal of Lightwave Technology, vol. 28, No. 4, Feb. 15, 2010, pp. 641-650, doi: 10.1109/JLT.2009.2030145.
Niffenegger et al., "Integrated multi-wavelength control of an ion qubit", Nature, vol. 586, No. 7830, Oct. 22, 2020, pp. 538-542, doi: 10.1038/s41586-020-2811-x.
Nilsson et al., "Linewidth and Feedback Sensitivity of Semiconductor Diode Lasers", IEEE Journal of Quantum Electronics, vol. 26, No. 12, Dec. 1990, pp. 2039-2042, doi: 10.1109/3.64336.
Notcutt et al., "Contribution of thermal noise to frequency stability of rigid optical cavity via Hertz-linewidth lasers", Physical Review A, vol. 73, Mar. 21, 2006, pp. 031804-1-031804-4, doi: 10.1103/PhysRevA.73.031804.
Nshii et al., "A surface-patterned chip as a strong source of ultracold atoms for quantum technologies", Nature Nanotechnology, vol. 8, May 2013, pp. 321-324, doi: 10.1038/nnano.2013.47.
Numata et al., "Thermal-Noise Limit in the Frequency Stabilization of Lasers with Rigid Cavities", Physical Review Letters, vol. 93, No. 250602, Dec. 17, 2004, pp. 250602-1-250602-4, doi: 10.1103/PhysRevLett.93.250602.
Olmschenk et al., "Manipulation and detection of a trapped Yb+ Hyperfine Qubit", Physical Review A, vol. 76, No. 5, Nov. 19, 2007, pp. 052314-1-052314-9, doi: 10.1103/PhysRevA.76.052314.
Olsson et al., "Probabilistically shaped PDM 4096-QAM transmission over up to 200 km of fiber using standard intradyne detection", Optics Express, vol. 26, No. 4, Feb. 19, 2018, pp. 4522-4530, doi: 10.1364/OE.26.004522.
Orieux et al., "Recent advances on integrated quantum communications", Journal of Optics, vol. 18, No. 8, Article 083002, Jul. 20, 2016, 13 pgs., doi: 10.1088/2040-8978/18/8/083002.
Osinsky et al., "Optical loss mechanisms in GeSiON planar waveguides", Applied Physics Letters, vol. 81, No. 11, Sep. 9, 2022, pp. 2002-2004, doi: 10.1063/1.1507611.
Padmaraju et al., "Resolving the thermal challenges for silicon microring resonator devices", Nanophotonics, vol. 3, No. 4-5, 2014, pp. 269-281, doi: 10.1515/nanoph-2013-0013.
Papp et al., "Mechanical Control of a Microrod-Resonator Optical Frequency Comb", Physical Review X, vol. 3, No. 031003, Jul. 8, 2013, pp. 031003-1-031003-7, doi: 10.1103/PhysRevX.3.031003.
Park et al., "40Gbit/s coherent optical receiver using a Costas loop", Optics Express, vol. 20, No. 26, Nov. 28, 2012, pp. B197-B203, doi: 10.1364/OE.20.00B197.
Perin et al., "Data center links beyond 100 Gbit/s per wavelength", Optical Fiber Technology, vol. 44, Aug. 2018, pp. 69-85, doi: 10.1016/j.yofte.2017.12.006.
Perin et al., "Design of Low-Power DSP-Free Coherent Receivers for Data Center Links", Journal of Lightwave Technology, vol. 35, No. 21, Nov. 1, 2017, pp. 4650-4662, doi: 10.1109/JLT.2017.2752079.
Petrov et al., "Features of magnetic field stabilization in caesium atomic clock for satellite navigation system", Journal of Physics: Conference Series, vol. 1038, No. 2018, Article 012032, Oct. 24-26, 2017, 7 pgs., doi: 10.1088/1742-6596/1038/1/012032.
Pfeiffer et al., "Ultra-smooth silicon nitride waveguides based on the Damascene reflow process: fabrication and loss origins", Optica, vol. 5, No. 7, Jul. 20, 2018, pp. 884-892, doi: 10.1364/OPTICA.5.000884.
Pfeifle et al., "Coherent terabit communications with microresonator Kerr frequency combs", Nature Photonics, vol. 8, May 2014, pp. 375-380, doi: 10.1038/nphoton.2014.57.
Pillai et al., "End-to-End Energy Modeling and Analysis of Long-Haul Coherent Transmission Systems", Journal of Lightwave Technology, vol. 32, No. 8, Sep. 15, 2014, pp. 3093-3111, doi: 10.1109/JLT.2014.2331086.
Pollock et al., "Characteristics of integrated magneto-optical traps for atom chips", New Journal of Physics, vol. 13, Article 043029, Apr. 2011, 13 pgs., doi: 10.1088/1367-2630/13/4/043029.
Puckett et al., "422 Million intrinsic quality factor planar integrated all-waveguide resonator with sub-MHz linewidth", Nature Communications, vol. 12, Article 934, Feb. 10, 2021, 8 pgs., doi: 10.1038/s41467-021-21205-4.
Puckett et al., "422 Million Q Planar Integrated All-Waveguide Resonator with a 3.4 Billion Absorption Limited Q and Sub-MHz Linewidth", arXiv:2009.07428v1 [physics.optics], Sep. 16, 2020, 20 pgs.
Puckett et al., "Broadband, ultrahigh efficiency fiber-to-chip coupling via multilayer nanophotonics", Applied Optics, vol. 60, No. 15, May 20, 2021, pp. 4340-4344, doi: 10.1364/AO.417177.
Qiu et al., "An Athermal hybrid silicon/polymer ring resonator electro-optic modulator", ACS Photonics, vol. 3, No. 5, Apr. 13, 2016, pp. 780-783, doi: 10.1021/acsphotonics.5b00695.
Qiu et al., "Athermal and High-Q Hybrid TiO2—Si3N4 Ring Resonator via an Etching-Free Fabrication Technique", ACS Photonics, vol. 2, No. 3, Feb. 25, 2015, pp. 405-409, doi: 10.1021/ph500450n.
Rafilov et al., "Mode-locked quantum-dot lasers", Nature Photonics, vol. 1, No. 7, Jul. 2007, pp. 395-401, doi: 10.1038/nphoton.2007.120.
Ramdas, "The Thermo-Optic Behaviour of Quartz", Proceedings of the Indian Academy of Sciences, vol. 35, Article 89, Feb. 1952, pp. 89-98, doi: 10.1007/BF03172491.
Raza et al., "High index contrast photonic platforms for on-chip Raman spectroscopy", Optics Express, vol. 27, No. 16, Aug. 5, 2019, pp. 23067-23079, doi: 10.1364/OE.27.023067.
Richardson et al., "Space-division multiplexing in optical fibres", Nature Photonics, vol. 7, May 2013, pp. 354-362, doi: 10.1038/nphoton.2013.94.
Riehle, "Optical clock networks", Nature Photonics, vol. 11, No. 9, Jan. 2017, pp. 25-31, doi: 10.1038/nphoton.2016.235.
Roberts et al., "Search for transient variations of the fine structure constant and dark matter using fiber-linked optical atomic clocks", New Journal of Physics, vol. 22, No. 093010, Sep. 4, 2020, 11 pgs., doi: 10.1088/1367-2630/abaace.
Roeloffzen et al., "Silicon nitride microwave photonic circuits", Optics Express, vol. 21, No. 19, Sep. 23, 2013, pp. 22937-22961, doi: 10.1364/OE.21.022937.
Satyan et al., "Phase noise reduction of a semiconductor laser in a composite optical phase-locked loop", Optical Engineering, vol. 49, No. 12, Dec. 2010, pp. 124301-1-124301-6, doi: 10.1117/1.3518077.
Savchenkov et al., "Calcium fluoride whispering gallery mode optical resonator with reduced thermal sensitivity", Journal of Optics, vol. 20, No. 3, Jan. 29, 2018, 4 pgs., doi: 10.1088/2040-8986/aaa6f9.
Savchenkov et al., "Whispering-gallery-mode resonators as frequency references. II. Stabilization", Journal of the Optical Society of America B, vol. 24, No. 12, Dec. 2007, pp. 2988-2997, doi: 10.1364/JOSAB.24.002988.
Schediwy et al., "Stabilized microwave-frequency transfer using optical phase sensing and actuation", Optics Letters, vol. 42, No. 9, May 1, 2017, pp. 1648-1651, doi: 10.1364/OL.42.001648.
Schilder et al., "850 nm hybrid-integrated tunable laser with Si3N4 micro-ring resonator feedback circuits", Optical Fiber Communication Conference (OFC), paper Th1E.6, 2022, 3 pgs., doi: 10.1364/OFC.2022.Th1E.6.
Schilt et al., "Frequency discriminators for the characterization of narrow-spectrum heterodyne beat signals: Application to the measurement of a sub-hertz carrier-envelope-offset beat in an optical frequency comb", Review of Scientific Instruments, vol. 82, No. 12, Dec. 2011, pp. 123116-1-123116-11, doi: 10.1063/1.3670357.
Schioppo et al., "Comparing ultrastable lasers at 7×10-17 fractional frequency instability through a 2220 km optical fibre network",

(56) References Cited

OTHER PUBLICATIONS

Nature Communications, vol. 13, No. 212, Jan. 11, 2022, 11 pgs., doi: 10.1038/s41467-021-27884-3.
Schioppo et al., "Ultrastable optical clock with two cold-atom ensembles", Nature Photonics, vol. 11, Jan. 2017, pp. 48-52, doi: 10.1038/nphoton.2016.231.
Schow et al., "INTREPID: Developing Power Efficient Analog Coherent Interconnects to Transform Data Center Networks", Optical Fiber Communications Conference and Exhibition (OFC), Mar. 3-7, 2019, 3 pgs., doi: 10.1364/OFC.2019.M4D.9.
Seimetz, "Laser Linewidth Limitations for Optical Systems with High-Order Modulation Employing Feed Forward Digital Carrier Phase Estimation", Conference on Optical Fiber Communication/ National Fiber Optic Engineers Conference, 2008, 3 pgs., doi: 10.1109/OFC.2008.4528637.
Shams-Ansari et al., "Reduced material loss in thin-film lithium niobate waveguides", APL Photonics, vol. 7, No. 8, Article 081301, Aug. 3, 2022, pp. 081301-1-081301-7, doi: 10.1063/5.0095146.
Sharma et al., "Synthesis and Characterization of LPCVD Polysilicon and Silicon Nitride Thin Films for MEMS Applications", Journal of Materials, vol. 2014, Article 954618, 2014, 8 pgs., doi: 10.1155/ 2014/954618.
Shi et al., "Suppression of residual amplitude modulation effects in Pound-Drever-Hall locking", Applied Physics B, vol. 124, Article 153, Jul. 7, 2018, 7 pgs., doi: 10.1007/s00340-018-7021-y.
Simsek et al., "A Chip-Scale Heterodyne Optical Phase-Locked Loop with Low-Power Consumption", Optical Fiber Communication Conference, paper W4G.3, 2017, 3 pgs., doi: 10.1364/OFC. 2017.W4G.3.
Simsek et al., "Evolution of Chip-Scale Heterodyne Optical Phase-Locked Loops Toward Watt Level Power Consumption", Journal of Lightwave Technology, vol. 36, No. 2, Jan. 15, 2018, pp. 258-264, doi: 10.1109/JLT.2017.2758744.
Sluyski et al., "Implementation Agreement 400ZR", Implementation Agreement created and approved OIF, OIF-400ZR-01.0, Optical Internetworking Forum, Mar. 10, 2020, 100 pgs.
Smit et al., "An introduction to InP-based generic integration technology", Semiconductor Science and Technology, vol. 29, No. 8, Article 083001, Jun. 13, 2014, 41 pgs., doi: 10.1088/0268-1242/ 29/8/083001.
Sorace-Agaskar et al., "Versatile Silicon Nitride and Alumina Integrated Photonic Platforms for the Ultraviolet to Short-Wave Infrared", IEEE Journal of Selected Topics in Quantum Electronics, vol. 25, No. 5, Sep.-Oct. 2019, 17 pgs., doi: 10.1109/jstqe.2019. 2904443.
Spektor et al., "Universal visible emitters in nanoscale integrated photonics", Optica, vol. 10, No. 7, Jul. 2023, pp. 871-879, doi: 10.1364/OPTICA.486747.
Spencer et al., "An Integrated-Photonics Optical-Frequency Synthesizer", arXiv:1708.05228, Aug. 15, 2017, 10 pgs.
Spencer et al., "An optical-frequency synthesizer using integrated photonics", Nature, vol. 557, Apr. 25, 2018, pp. 81-85, doi: 10.1038/ s41586-018-0065-7.
Spencer et al., "Integrated waveguide coupled Si3N4 resonators in the ultrahigh-Q regime", Optica, vol. 1, No. 3, Sep. 2014, pp. 153-157, doi: 10.1364/OPTICA.1.000153.
Stanfield et al., "CMOS-compatible, piezo-optomechanically tunable photonics for visible wavelengths and cryogenic temperatures", Optics Express, vol. 27, No. 20, Sep. 30, 2019, pp. 28588-28605, doi: 10.1364/OE.27.028588.
Strekalov et al., "Nonlinear and quantum optics with whispering gallery resonators", Journal of Optics, vol. 18, No. 12, Nov. 16, 2016, 43 pgs., doi: 10.1088/2040-8978/18/12/123002.
Suematsu et al., "Optical Second-Harmonic Generation Due to Guided-Wave Structure Consisting of Quartz and Glass Film", IEEE Journal of Quantum Electronics, vol. 10, No. 2, Feb. 1974, pp. 222-229, doi: 10.1109/JQE.1974.1145777.
Taillaert et al., "Grating Couplers for Coupling between Optical Fibers and Nanophotonic Waveguides", Japanese Journal of Applied Physics, vol. 45, No. 8A, 2006, pp. 6071-6077, doi: 10.1143/JJAP. 45.6071.
Tang et al., "Over 67 GHz bandwidth hybrid silicon electroabsorption modulator with asymmetric segmented electrode for 1.3 μm transmission", Optics Express, vol. 20, No. 10, May 4, 2012, pp. 11529-11535, doi: 10.1364/OE.20.011529.
Tao et al., "Demonstration of a compact wavelength tracker using a tunable silicon resonator", Optics Express, vol. 22, No. 20, Sep. 25, 2014, pp. 24104-24110, doi: 10.1364/OE.22.024104.
Taylor, "Coherent Detection Method Using DSP for Demodulation of Signal and Subsequent Equalization of Propagation Impairments", IEEE Photonics Technology Letters, vol. 16, No. 2, Feb. 2004, pp. 674-676, doi: 10.1109/LPT.2003.823106.
Thorpe et al., "Laser frequency stabilization and control through offset sideband locking to optical cavities", Optics Express, vol. 16, No. 20, Sep. 24, 2008, pp. 15980-15990, doi: 10.1364/oe.16. 015980.
Tian et al., "Hybrid integrated photonics using bulk acoustic resonators", Nature Communications, vol. 11, Article 3073, Jun. 17, 2020, 8 pgs., doi: 10.1038/s41467-020-16812-6.
Toyoda et al., "The temperature dependence of the refractive indices of fused silica and crystal quartz", Journal of Physics D: Applied Physics, vol. 16, No. 5, 1983, pp. L97-L100, doi: 10.1088/0022-3727/16/5/002.
Tran et al., "Ring-Resonator Based Widely-Tunable Narrow-Linewidth Si/InP Integrated Lasers", IEEE Journal of Selected Topics in Quantum Electronics, vol. 26, No. 2, Article 1500514, Mar./Apr. 2020, 14 pgs., doi: 10.1109/jstqe.2019.2935274.
Tzimpragos et al., "A Survey on FEC Codes for 100G and Beyond Optical Networks", IEEE Communications Surveys & Tutorials, vol. 18, No. 1, Jan. 1, 2016, pp. 209-221, doi: 10.1109/COMST. 2014.2361754.
Vahala et al., "Detuned loading in coupled cavity semiconductor lasers—Effect on quantum noise and dynamics", Applied Physics Letters, vol. 45, No. 5, Sep. 1, 1984, pp. 501-503, doi: 10.1063/1. 95316.
Vahala et al., "Semiclassical Theory of Noise in Semiconductor Lasers—Part I", IEEE Journal of Quantum Electronics, vol. 19, No. 6, Jun. 1983, pp. 1096-1101, doi: 10.1109/JQE.1983.1071986.
Vahala et al., "Semiclassical Theory of Noise in Semiconductor Lasers—Part II", IEEE Journal of Quantum Electronics, vol. 19, No. 6, Jun. 1983, pp. 1102-1109, doi: 10.1109/JQE.1983.1071984.
Verrinder et al., "Gallium Arsenide Photonic Integrated Circuit Platform for Tunable Laser Applications", IEEE Journal of Selected Topics in Quantum Electronics, vol. 28, No. 1, Article 6100109, Jan./Feb. 2022, 9 pgs., doi: 10.1109/jstqe.2021.3086074.
Wang et al., "A low-power PZT stress-optic Si3N4 micro-ring modulator for PDH locking applications", Conference on Lasers and Electro-Optics, paper STu5G.2, 2022, 2 pgs., doi: 10.1364/ CLEO_SI.2022.STu5G.2.
Wang et al., "Fully symmetric controllable integrated three-resonator photonic molecule", arXiv:2105.10815, May 22, 2021, 14 pgs.
Wang et al., "Independently Coupled and PZT Controllable Photonic Integrated Three Resonator Photonic Molecule", Conference on Lasers and Electro-Optics (CLEO), paper STu1F.7, 2021, 2 pgs., doi: 10.1364/CLEO_SI.2021.STu1F.7.
Wang et al., "Integrated photonic quantum technologies", Nature Photonics vol. 14, No. 5, May 2020, pp. 273-284, doi: 10.1038/ s41566-019-0532-1.
Wang et al., "Low loss, low power, silicon nitride PZT stress-optic microresonator modulator for control functions", Frontiers in Optics / Laser Science, 2021, 2 pgs., doi: 10.1364/FIO.2021.FW6B.2.
Wang et al., "Nanophotonic lithium niobate electro-optic modulators", Optics Express, vol. 26, No. 2, Jan. 22, 2018, pp. 1547-1555, doi: 10.1364/OE.26.001547.
Wang et al., "Silicon nitride stress-optic microresonator modulator for optical control applications", Optics Express, vol. 30, No. 18, Aug. 29, 2022, pp. 31816-31827, doi: 10.1364/OE.467721.

(56) References Cited

OTHER PUBLICATIONS

Wang et al., "Ultra-low loss silicon nitride ring modulator with low power PZT actuation for photonic control", Optical Fiber Communication Conference (OFC), paper W3D.5, 2022, 3 pgs., doi: 10.1364/OFC.2022.W3D.5.
Wang et al., "Wave Propagation in Thin-Film Optical Waveguides Using Gyrotropic and Anisotropic Materials as Substrates", IEEE Journal of Quantum Electronics, vol. 8, No. 2, Feb. 1972, pp. 212-216, doi: 10.1109/JQE.1972.1076911.
Wanser, "Fundamental Phase Noise Limit in Optical Fibres Due to Temperature Fluctuations", Electronics Letters, vol. 28, No. 1, Jan. 2, 1992, pp. 53-54, doi: 10.1049/el:19920033.
Welch, "100 Gbps/lambda vs. 50 Gbps/lambda : Cost and Power Comparisons in Silicon Photonics", Luxtera, Retrieved from internet: <https://www.ieee802.org/3/bs/public/15_01/welch_3bs_02_0115.pdf>, Retrieved on Aug. 27, 2025, 21 pgs.
Weng et al., "Nano-Kelvin Thermometry and Temperature Control: Beyond the Thermal Noise Limit", Physical Review Letters, vol. 112, No. 160801, Apr. 21, 2014, pp. 160801-1-160801-5, doi: 10.1103/PhysRevLett.112.160801.
Williams et al., "High-stability transfer of an optical frequency over long fiber-optic links", Journal of the Optical Society of America B, vol. 25, No. 8, Aug. 2008, pp. 1284-1293, doi: 10.1364/JOSAB.25.001284.
Winzer, "Scaling Optical Fiber Networks: Challenges and Solutions", Optics and Photonics News, vol. 26, No. 3, Mar. 2015, pp. 28-35, doi: 10.1364/OPN.26.3.000028.
Wong et al., "Review—Progress in High Performance III-Nitride Micro-Light-Emitting Diodes", ECS Journal of Solid State Science and Technology, vol. 9, No. 1, Article 015012, 8 pgs., doi: 10.1149/2.0302001JSS.
Wu et al., "0.26-Hz-linewidth ultrastable lasers at 1557 nm", Scientific Reports, vol. 6, Article 24969, Apr. 27, 2016, 5 pgs., doi: 10.1038/srep24969.
Wu et al., "Low-loss and high-Q Ta205 based micro-ring resonator with inverse taper structure", Optics Express, vol. 23, No. 20, Sep. 29, 2015, pp. 26268-26275, doi: 10.1364/OE.23.026268.
Wu et al., "Low-noise Kerr frequency comb generation with low temperature deuterated silicon nitride waveguides", Optics Express, vol. 29, No. 18, Aug. 30, 2021, pp. 29557-29566, doi: 10.1364/OE.438436.
Wu et al., "Tantalum pentoxide (Ta2O5) based athermal micro-ring resonator", OSA Continnum, vol. 2, No. 4, Apr. 15, 2019, pp. 1198-1206, doi: 10.1364/OSAC.2.001198.
Xiang et al., "High-Performance Silicon Photonics Using Heterogeneous Integration", IEEE Journal of Selected Topics in Quantum Electronics, vol. 28, No. 3, Article 8200515, May/Jun. 2022, 15 pgs., doi: 10.1109/jstqe.2021.3126124.
Xie et al., "Soliton frequency comb generation in CMOScompatible silicon nitride microresonators", Photonics Research, vol. 10, No. 5, May 2022, pp. 1290-1296, doi: 10.1364/PRJ.454816.
Xiong et al., "Low-Loss, Silicon Integrated, Aluminum Nitride Photonic Circuits and Their Use for Electro-Optic Signal Processing", Nano Letters, vol. 12, No. 7, Jun. 4, 2012, pp. 3562-3568, doi: 10.1021/nl3011885.
Xu et al., "Micrometre-scale silicon electro-optic modulator", Nature, vol. 435, No. 7040, May 19, 2005, pp. 325-327, doi: 10.1038/nature03569.
Xue et al., "Thermal tuning of Kerr frequency combs in silicon nitride microring resonators", Optics Express, vol. 24, No. 1, 2016, pp. 687-698, doi: 10.1364/OE.24.000687.
Yang et al., "Bridging ultrahigh-Q devices and photonic circuits", Nature Photonics, vol. 12, Mar. 19, 2018, pp. 297-302, doi: 10.1038/s41566-018-0132-5.
Ye et al., "Foundry manufacturing of tight-confinement, dispersion-engineered, ultralow-loss silicon nitride photonic integrated circuits", Photonic Research, vol. 11, No. 4, Apr. 2023, pp. 558-568, doi: 10.1364/PRJ.486379.
Ye et al., "Low-loss high-Q silicon-rich silicon nitride microresonators for Kerr nonlinear optics", Optics letters, vol. 44, No. 13, Jul. 1, 2019, pp. 3326-3329, doi: 10.1364/OL.44.003326.
Ye et al., "Quantum State Engineering and Precision Metrology Using State-Insensitive Light Traps", Science, vol. 320, No. 5884, Jun. 27, 2008, pp. 1734-1738, doi: 10.1126/science.1148259.
Yi et al., "Phase Noise Effects on High Spectral Efficiency Coherent Optical OFDM Transmission", Journal of Lightwave Technology, vol. 26, No. 10, May 15, 2008, pp. 1309-1316, doi: 10.1109/JLT.2008.919368.
Yu et al., "Trade-off between optical modulation amplitude and modulation bandwidth of silicon micro-ring modulators", Optics Express, vol. 22, No. 12, Jun. 12, 2014, pp. 15178-15189, doi: 10.1364/OE.22.015178.
Zeng et al., "Stabilizing a laser frequency by the Pound-Drever-Hall technique with an acousto-optic modulator", Applied Optics, vol. 60, No. 5, Feb. 10, 2021, pp. 1159-1163, doi: 10.1364/AO.415011.
Zhang et al., "An integrated silicon photonic chip platform for continuous-variable quantum key distribution", Nature Photonics, vol. 13, Aug. 12, 2019, pp. 839-842, doi: 10.1038/s41566-019-0504-5.
Zhang et al., "Microrod Optical Frequency Reference in the Ambient Environment", Physical Review Applied, vol. 12, No. 024010, Aug. 6, 2019, pp. 024010-1-024010-7, doi: 10.1103/PhysRevApplied.12.024010.
Zhang et al., "Silicon photonic terabit/s network-on-chip for datacenter interconnection", Optical Fiber Technology, vol. 44, Aug. 2018, pp. 2-12, doi: 10.1016/j.yofte.2017.12.007.
Zhang et al., "Ultranarrow Linewidth Photonic-Atomic Laser", Laser & Photonics Reviews, vol. 14, No. 4, Article 1900293, 2020, 7 pgs., doi: 10.1002/lpor.201900293.
Zhao et al., "Integrated reference cavity with dual-mode optical thermometry for frequency correction", Optica, vol. 8, No. 11, Nov. 2021, pp. 1481-1487, doi: 10.1364/OPTICA.432194.
Zhao et al., "Laser Frequency Drift Stabilization using an Integrated Dual-Mode Locking Si3N4 Waveguide Reference Cavity", Conference on Lasers and Electro-Optics (CLEO), 2021, 2 pgs.
Zhao et al., "Low-loss D-shape Silicon Nitride Waveguides Using a Dielectric Lift-off Fabrication Process", Conference on Lasers and Electro-Optics OSA Technical Digest (Optica Publishing Group), 2020, 2 pgs., doi: 10.1364/CLEO_SI.2020.STh1J.3.
Zhao et al., "Low-loss low thermo-optic coefficient Ta2O5 on crystal quartz planar optical waveguides", APL Photonics, vol. 5, No. 11, Article 116103, Nov. 2020, pp. 116103-1-116103-8, doi: 10.1063/5.0024743.
Zhu et al., "A dielectric metasurface optical chip for the generation of cold atoms", Science Advances, vol. 6, No. 31, Article eabb6667, Jul. 29, 2020, 5 pgs., doi: 10.1126/sciadv.abb6667.
Zhuo et al., "RAIL: A Case for Redundant Arrays of Inexpensive Links in Data Center Networks", NSDI'17: Proceedings of the 14th USENIX Conference on Networked Systems Design and Implementation, 2017, pp. 561-576.
Zietz et al., "Characterization and Manipulation of Carbon Precursor Species during Plasma Enhanced Chemical Vapor Deposition of Graphene", Nanomaterials, vol. 10, No. 11, Article 2235, 2020, 11 pgs., doi: 10.3390/nano10112235.
Zou et al., "Ultra efficient silicon nitride grating coupler with bottom grating reflector", Optics Express, vol. 23, No. 20, Oct. 5, 2015, pp. 26305-26312, doi: 10.1364/OE.23.026305.
Frigg et al., "Optical frequency comb generation using low stress CMOS compatible reactive sputtered silicon nitride waveguides", Proceedings of SPIE, Integrated Photonics Platforms: Fundamental Research, Manufacturing and Applications, vol. 11364, Apr. 2, 2020, pp. 113640N-1-113640N-8, doi: 10.1117/12.2564640.
Fujieda et al., "All-optical link for direct comparison of distant optical clocks", Optics Express, vol. 19, No. 17, Aug. 11, 2011, pp. 16498-16507, doi: 10.1364/OE.19.016498.
Gaeta et al., "Photonic-chip-based frequency combs", Nature Photonics, vol. 13, Feb. 21, 2019, pp. 158-169, doi: 10.1038/s41566-019-0358-x.
Gardner, "Phaselock Techniques", Third Edition, Wiley-Interscience, 2005, 445 pgs. (Presented in 2 parts).

(56) References Cited

OTHER PUBLICATIONS

Golshani et al., "Low-loss, low-temperature PVD SiN waveguides", IEEE 17th International Conference on Group IV Photonics, Dec. 2021, 2 pgs., doi: 10.1109/GFP51802.2021.9673874.
Gorodetsky et al., "Fundamental thermal fluctuations in microspheres", Journal of the Optical Society of America B, vol. 21, No. 4, Apr. 2004, pp. 697-705, doi: 10.1364/JOSAB.21.000697.
Grotti et al., "Geodesy and metrology with a transportable optical clock", Nature Physics, vol. 14, No. 5, Feb. 12, 2018, pp. 437-441, doi: 10.1038/s41567-017-0042-3.
Gumyusenge et al., "High Temperature Organic Electronics", MRS Advances, vol. 5, Sep. 17, 2020, pp. 505-513, doi: 10.1557/adv.2020.31.
Gundavarapu et al., "Integrated Waveguide Brillouin Laser", arXiv:1709.04512v1, Sep. 13, 2017, 15 pgs.
Gundavarapu et al., "Sub-hertz fundamental linewidth photonic integrated Brillouin laser", Nature Photonics, vol. 13, Jan. 2019, pp. 60-67, doi: 10.1038/s41566-018-0313-2.
Guzzon et al., "Spurious-Free Dynamic Range in Photonic Integrated Circuit Filters with Semiconductor Optical Amplifiers", IEEE Journal of Quantum Electronics, vol. 48, No. 2, Feb. 2012, pp. 269-278, doi: 10.1109/JQE.2011.2174618.
Hafner et al., "8×10-17 fractional laser frequency instability with a long room-temperature cavity", Optics Letters, vol. 40, No. 9, May 1, 2015, pp. 2112-2115, doi: 10.1364/OL.40.002112.
Hainberger et al., "PECVD silicon nitride optical waveguide devices for sensing applications in the visible and <1μm near infrared wavelength region", Proceedings of SPIE, vol. 11031, Article 110310A, 2019, pp. 110310A-1-110310A-8, doi: 10.1117/12.2524277.
Hansel et al., "Opportunities for photonic integrated circuits in optical gas sensors", Journal of Physics: Photonics, vol. 2, No. 1, Article 012002, Jan. 23, 2020, 17 pgs., doi: 10.1088/2515-7647/ab6742.
Harish et al., "Optimization of Phase Modulation Formats for Suppression of Stimulated Brillouin Scattering in Optical Fibers", IEEE Journal of Selected Topics in Quantum Electronics, vol. 24, No. 3, May/Jun. 2018, 10 pgs., doi: 10.1109/JSTQE.2017.27530 41.
Harrington et al., "Kerr Soliton Microcomb Pumped by an Integrated SBS Laser for Ultra-Low Linewidth WDM Sources", Optical Fiber Communications Conference (OFC), paper T4G.6, 2020, 3 pgs., doi: 10.1364/OFC.2020.T4G.6.
He et al., "Broadband athermal waveguides and resonators for datacom and telecom applications", Photonics Research, vol. 6, No. 11, Nov. 2018, pp. 987-990, doi: 10.1364/PRJ.6.000987.
Helms et al., "A Simple Analytic Expression for the Stable Operation Range of Laser Diodes with Optical Feedback", IEEE Journal of Quantum Electronics, vol. 26, No. 5, May 1990, pp. 833-836, doi: 10.1109/3.55523.
Henry, "Theory of the Phase Noise and Power Spectrum of a Single Mode Injection Laser", IEEE Journal of Quantum Electronics, vol. 19, No. 9, Sep. 1983, pp. 1391-1397, doi: 10.1109/JQE.1983.1072058.
Hermans et al., "Integrated silicon nitride electro-optic modulators with atomic layer deposited overlays", Optics Letters, vol. 44, No. 5, Mar. 1, 2019, pp. 1112-1115, doi: 10.1364/ol.44.001112.
Herr et al., "Universal formation dynamics and noise of Kerr-frequency combs in microresonators", Nature Photonics, vol. 6, No. 7, Jun. 24, 2012, pp. 480-487, doi: 10.1038/nphoton.2012.127.
Hirata et al., "Sub-hertz-linewidth diode laser stabilized to an ultralow-drift high-finesse optical cavity", Applied Physics Express, vol. 7, No. 2, Jan. 30, 2014, pp. 022705-1-022705-4, doi: 10.7567/APEX.7.022705.
Hjelme et al., "Semiconductor Laser Stabilization by External Optical Feedback", IEEE Journal of Quantum Electronics, vol. 27, No. 3, Mar. 1991, pp. 352-372, doi: 10.1109/3.81333.
Horak et al., "On the delayed self-heterodyne interferometric technique for determining the linewidth of fiber lasers", Optics Express, vol. 14, No. 9, Apr. 19, 2006, pp. 3923-3928, doi: 10.1364/oe.14.003923.
Hosseini et al., "Stress-optic modulator in TriPlex platform using a piezoelectric lead zirconate titanate (PZT) thin film", Optics Express, vol. 23, No. 11, May 19, 2015, pp. 14018-14026, doi: 10.1364/oe.23.014018.
Hoth et al., "Atom number in magneto-optic traps with millimeter scale laser beams", Optics Letters, vol. 38, No. 5, Mar. 1, 2013, pp. 661-663, doi: 10.1364/OL.38.000661.
Huang et al., "Analysis of the optical feedback dynamics in InAs/GaAs quantum dot lasers directly grown on silicon", Journal of the Optical Society of America B, vol. 35, No. 11, Nov. 2018, pp. 2780-2787, doi: 10.1364/JOSAB.35.002780.
Huang et al., "Effect of deposition conditions on mechanical properties of low-temperature PECVD silicon nitride films", Materials Science and Engineering: A, vol. 435-436, Nov. 5, 2006, pp. 453-459, doi: 10.1016/j.msea.2006.07.015.
Huang et al., "High-power sub-kHz linewidth lasers fully integrated on silicon", Optica, vol. 6, No. 6, Jun. 2019, pp. 745-752, doi: 10.1364/OPTICA.6.000745.
Huang et al., "Thermorefractive noise in silicon-nitride microresonators", Physical Review A, vol. 99, No. 061801 (R), Jun. 24, 2019, pp. 061801-1-061801-5, doi: 10.1103/PhysRevA.99.061801.
Huffman, "Integrated Si3N4 Waveguide Circuits for Single- and Multi-Layer Applications", Dissertation, University of California, Santa Barbara, Dec. 2018, 129 pgs.
Huffman et al., "Ultra-Low Loss Large Area Waveguide Coils for Integrated Optical Gyroscopes", IEEE Photonics Technology Letters, vol. 29, No. 2, Jan. 15, 2017, pp. 185-188, doi: 10.1109/LPT.2016.2620433.
Hulme et al., "Fully integrated microwave frequency synthesizer on heterogeneous silicon-III/V", Optics Express, vol. 25, No. 3, Feb. 6, 2017, pp. 2422-2431, doi: 10.1364/OE.25.002422.
Hummon et al., "Photonic chip for laser stabilization to an atomic vapor with 10-11 instability", Optica, vol. 5, No. 4, Apr. 2018, pp. 443-449, doi: 10.1364/OPTICA.5.000443.
Idjadi et al., "Nanophotonic phase noise filter in silicon", Nature Photonics, vol. 14, Mar. 16, 2020, pp. 234-239, doi: 10.1038/s41566-020-0605-1.
Ikeda et al., "Thermal and Kerr nonlinear properties of plasma-deposited silicon nitride/ silicon dioxide waveguides", Optics Express, vol. 16, No. 17, Aug. 11, 2008, pp. 12987-12994, doi: 10.1364/oe.16.012987.
Ilchenko et al., "Crystal quartz optical whispering-gallery resonators", Optics Letters, vol. 33, No. 14, Jul. 15, 2008, pp. 1569-1571, doi: 10.1364/OL.33.001569.
Ip et al., "Coherent detection in optical fiber systems", Optics Express, vol. 16, No. 2, Jan. 9, 2008, pp. 753-791, doi: 10.1364/oe.16.000753.
Isichenko et al., "Chip-Scale, Sub-Hz Fundamental Sub-kHz Integral Linewidth 780 nm Laser through Self-Injection—Locking a Fabry-Pérot laser to an Ultra-High Q Integrated Resonator", Preprint, 2023, 10 pgs., doi: 10.48550/arXiv.2307.04947.
Isichenko et al., "Cooling rubidium atoms with a photonic integrated 3D magneto-optical trap", Optical Sensors and Sensing Congress, paper STu4G.6, 2022, 2 pgs., doi: 10.1364/Sensors.2022.STu4G.6.
Isichenko et al., "Photonic integrated beam delivery for a rubidium 3D magneto-optical trap", Nature Communications, vol. 14, Article 3080, May 29, 2023, 8 pgs., doi: 10.1038/s41467-023-38818-6.
Jadbabaie et al., "Enhanced molecular yield from a cryogenic buffer gas beam source via excited state chemistry", New Journal of Physics, vol. 22, No. 2, Article 022002, Feb. 13, 2020, 11 pgs., doi: 10.1088/1367-2630/ab6eae.
Ji et al., "Recent Progress in Aromatic Polyimide Dielectrics for Organic Electronic Devices and Circuits", Advanced Materials, vol. 31, No. 15, Article 1806070, Apr. 12, 2019, 19 pgs., doi: 10.1002/adma.201806070.
Ji et al., "Ultra-low-loss on-chip resonators with sub-milliwatt parametric oscillation threshold", Optica, vol. 4, No. 6, Jun. 2017, pp. 619-624, doi: 10.1364/OPTICA.4.000619.
Ji et al., "Ultra-Low-Loss Silicon Nitride Photonics Based on Deposited Films Compatible with Foundries", Laser & Photonics Reviews, vol. 17, No. 3, Article 2200544, Mar. 2023, 18 pgs., doi: 10.1002/lpor.202200544.

(56) References Cited

OTHER PUBLICATIONS

Jiang et al., "Long-distance frequency transfer over an urban fiber link using optical phase stabilization", Journal of the Optical Society of America B, vol. 25, No. 12, Nov. 20, 2008, pp. 2029-2035, doi: 10.1364/JOSAB.25.002029.
Jiang et al., "Making optical atomic clocks more stable with 10-16-level laser stabilization", Nature Photonics, vol. 5, Mar. 2011, pp. 158-161, doi: 10.1038/nphoton.2010.313.
Jin et al., "Deuterated silicon dioxide for heterogeneous integration of ultra-low-loss waveguides", Optic Letters, vol. 45, No. 12, Jun. 15, 2020, pp. 3340-3343, doi: 10.1364/OL.394121.
Jin et al., "Hertz-linewidth semiconductor lasers using CMOS-ready ultra-high-Q microresonators", Nature Photonics, vol. 15, No. 5, May 2021, pp. 346-353, doi: 10.1038/s41566-021-00761-7.
Jin et al., "Piezoelectric tuning of a suspended silicon nitride ring resonator", IEEE Photonics Conference (IPC), 2017, pp. 117-118, doi: 10.1109/IPCon.2017.8116029.
Jin et al., "Piezoelectrically tuned silicon nitride ring resonator", Optic Express, vol. 26, No. 3, Jan. 30, 2018, pp. 3174-3187, doi: 10.1364/OE.26.003174.
John, "Etchless Core-Definition Process for the Realization of Low Loss Glass Waveguides", Dissertation, University of California, Santa Barbara, Jun. 2012, 319 pgs.
Jung et al., "Highly reliable low threshold InAs quantum dot lasers on on-axis (001) Si with 87% injection efficiency", ACS Photonics, vol. 5, No. 3, Dec. 18, 2017, pp. 1094-1100, doi: 10.1021/acsphotonics.7b01387.
Jung et al., "Tantala Kerr nonlinear integrated photonics", Optica, vol. 8, No. 6, Jun. 2021, pp. 811-817, doi: 10.1364/OPTICA.411968.
Kakkar et al., "Laser Frequency Noise in Coherent Optical Systems: Spectral Regimes and Impairments", Scientific Reports, vol. 7, No. 1, Article 844, 2017, 10 pgs., doi: 10.1038/s41598-017-00868-4.
Karimelahi et al., "Ring modulator small-signal response analysis based on pole-zero representation", Optics Express, vol. 24, No. 7, Mar. 30, 2016, pp. 7585-7599, doi: 10.1364/OE.24.007585.
Kazarinov et al., "The Relation of Line Narrowing and Chirp Reduction Resulting From the Coupling of a Semiconductor Laser to Passive Resonator", IEEE Journal of Quantum Electronics, vol. 23, No. 9, Sep. 1987, pp. 1401-1409, doi: 10.1109/JQE.1987.1073531.
Kazovsky, "Phase- and Polarization-Diversity Coherent Optical Techniques", Journal of Lightwave Technology, vol. 7, No. 2, Feb. 1989, pp. 279-292, doi: 10.1109/50.17768.
Kazovsky et al., "A 1320-nm Experimental Optical Phase-Locked Loop: Performance Investigation and PSK Homodyne Experiments at 140 Mb/s and 2 Gb/s", Journal of Lightwave Technology, vol. 8, No. 9, Sep. 1990, pp. 1414-1425, doi: 10.1109/50.59173.
Kazovsky et al., "Balanced Phase-Locked Loops for Optical Homodyne Receivers: Performance Analysis, Design Considerations, and Laser Linewidth Requirements", Journal of Lightwave Technology, vol. 4, No. 2, Feb. 1986, pp. 182-195, doi: 10.1109/JLT.1986.1074698.
Kessler et al., "A sub-40-mHz-linewidth laser based on a silicon single-crystal optical cavity", Nature Photonics, vol. 6, Oct. 2012, pp. 687-692, doi: 10.1038/nphoton.2012.217.
Kharel et al., "Ultra-high-Q phononic resonators on-chip at cryogenic temperatures", APL Photonics, vol. 3, No. 6, Jun. 2018, pp. 066101-1-066101-9, doi: 10.1063/1.5026798.
Kikuchi, "Fundamentals of Coherent Optical Fiber Communications", Journal of Lightwave Technology, vol. 34, No. 1, Jan. 1, 2016, pp. 157-179, doi: 10.1109/JLT.2015.2463719.
Kippenberg et al., "Dissipative Kerr solitons in optical microresonators", Science, vol. 361, No. 6402, Aug. 10, 2018, 11 pgs., doi: 10.1126/science.aan8083.
Kippenberg et al., "Microresonator-Based Optical Frequency Combs", Science, vol. 332, No. 6029, Apr. 29, 2011, pp. 555-559, doi: 10.1126/science.1193968.
Kirkendall et al., "Overview of high performance fibre-optic sensing", Journal of Physics D: Applied Physics, vol. 37, No. 18, Sep. 1, 2004, pp. R197-R216, doi: 10.1088/0022-3727/37/18/R01.
Kitching et al., "Atomic Sensors—A Review", IEEE Sensors Journal, vol. 11, No. 9, Sep. 2011, pp. 1749-1758, doi: 10.1109/JSEN.2011.2157679.
Kohler et al., "Biophotonic sensors with integrated Si3N4-organic hybrid (SiNOH) lasers for point-of-care diagnostics", Light: Science & Applications, vol. 10, No. 64, Mar. 26, 2021, 12 pgs., doi: 10.1038/s41377-021-00486-w.
Koizumi et al., "1024 QAM (60 Gbit/s) single-carrier coherent optical transmission over 150 km", Optics Express, vol. 20, No. 11, May 17, 2012, pp. 12508-12514, doi: 10.1364/OE.20.012508.
Komljenovic et al., "Photonic Integrated Circuits Using Heterogeneous Integration on Silicon", Proceedings of the IEEE, vol. 106, No. 12, Aug. 30, 2018, pp. 2246-2257, doi: 10.1109/JPROC.2018.2864668.
Komljenovic et al., "Widely-Tunable Ring-Resonator Semiconductor Lasers", Applied Sciences, vol. 7, No. 7, Article 732, Jul. 17, 2017, 21 pgs., doi: 10.3390/app7070732.
Koos et al., "Silicon-Organic Hybrid (SOH) and Plasmonic-Organic Hybrid (POH) Integration", Journal of Lightwave Technology, vol. 34, No. 2, Jan. 15, 2016, pp. 256-268, doi: 10.1109/JLT.2015.2499763.
Kwee et al., "Stabilized high-power laser system for the gravitational wave detector advanced LIGO", Optics Express, vol. 20, No. 10, Apr. 24, 2012, pp. 10617-10634, doi: 10.1364/OE.20.010617.
Lacava et al., "Si-rich Silicon Nitride for Nonlinear Signal Processing Applications", Scientific Reports, vol. 7, Article 22, Feb. 2, 2017, 13 pgs., doi: 10.1038/s41598-017-00062-6.
Laperle et al., "Advances in High-Speed DACs, ADCs, and DSP for Optical Coherent Transceivers", Journal of Lightwave Technology, vol. 32, No. 4, Feb. 15, 2014, pp. 629-643, doi: 10.1109/JLT.2013.2284134.
Lee et al., "A compact cold-atom interferometer with a high data-rate grating magneto-optical trap and a photonic-integrated-circuit-compatible laser system", Nature Communications, vol. 13, Article 5131, Sep. 1, 2022, 12 pgs., doi: 10.1038/s41467-022-31410-4.
Lee et al., "Spiral resonators for on-chip laser frequency stabilization", Nature Communications, vol. 4, Article 2468, Sep. 17, 2013, 6 pgs., doi: 10.1038/ncomms3468.
Levine, "Introduction to time and frequency metrology", Review of Scientific Instruments, vol. 70, No. 6, Jun. 1, 1999, pp. 2567-2596, doi: 10.1063/1.1149844.
Li et al., "Characterization of a high coherence, Brillouin microcavity laser on silicon", Optics Express, vol. 20, No. 18, Aug. 20, 2012, pp. 20170-20180, doi: 10.1364/OE.20.020170.
Li et al., "High-precision and fast-response laser power stabilization system for cold atom experiments", AIP Advances, vol. 8, No. 9, Sep. 21, 2018, pp. 095221-1-095221-9, doi: 10.1063/1.5040238.
Li et al., "Microwave synthesizer using an on-chip Brillouin oscillator", Nature Communications, vol. 4, Article 2097, Jun. 28, 2013, 7 pgs., doi: 10.1038/ncomms3097.
Li et al., "Sideband spectroscopy and dispersion measurement in microcavities", Optics Express, vol. 20, No. 24, Nov. 7, 2012, pp. 26337-26344, doi: 10.1364/OE.20.026337.
Li et al., "Stably accessing octave-spanning microresonator frequency combs in the soliton regime", Optica, vol. 4, No. 2, Feb. 2017, pp. 193-203, doi: 10.1364/OPTICA.4.000193.
Liang et al., "Integrated finely tunable microring laser on silicon", Nature Photonics, vol. 10, Sep. 12, 2016, pp. 719-722, doi: 10.1038/nphoton.2016.163.
Liang et al., "Ultralow noise miniature external cavity semiconductor laser", Nature Communications, vol. 6, Article 7371, Jun. 24, 2015, 6 pgs., doi: 10.1038/ncomms8371.
Liao et al., "Dependence of a microresonator Kerr frequency comb on the pump linewidth", Optics Letters, vol. 42, No. 4, Feb. 15, 2017, pp. 779-782, doi: 10.1364/OL.42.000779779-782.
Lihachev et al., "Low-noise frequency-agile photonic integrated lasers for coherent ranging", Nature Communications, vol. 13, No. 1, Article 3522, Jun. 20, 2022, 10 pgs., doi: 10.1038/s41467-022-30911-6.
Lim et al., "Chasing the thermodynamical noise limit in whispering-gallery-mode resonators for ultrastable laser frequency stabiliza-

(56) References Cited

OTHER PUBLICATIONS tion", Nature Communications, vol. 8, No. 1, Article 8, Mar. 31, 2017, 7 pgs., doi: 10.1038/s41467-017-00021-9.
Lim et al., "Probing 10 muK stability and residual drifts in the cross-polarized dual-mode stabilization of single-crystal ultra-high-Q optical resonators", Light, Science & Applications, vol. 8, Article 1, Jan. 3, 2019, 9 pgs., doi: 10.1038/s41377-018-0109-7.
Link et al., "Dual-comb spectroscopy of water vapor with a free-running semiconductor disk laser", Science, vol. 356, No. 6343, May 11, 2017, pp. 1164-1168, doi: 10.1126/science.aam7424.
Lisdat et al., "A clock network for geodesy and fundamental science", Nature Communications, vol. 7, Article 12443, Aug. 9, 2016, 7 pgs., doi: 10.1038/ncomms12443.
Liu et al., "36 Hz Integral Linewidth Laser Based on a Photonic Integrated 4.0 M Coil Resonator", Optica, vol. 9, No. 7, Jul. 7, 2022, pp. 770-775, doi: 10.1364/OPTICA.451635.
Liu et al., "720 Million Quality Factor Integrated All-Waveguide Photonic Resonator", Device Research Conference (DRC), Jun. 20, 2021, 2 pgs., doi: 10.1109/DRC52342.2021.9467132.
Liu et al., "A Novel 16-Channel WDM Silicon Photonics Transceiver with Interleavers for Simplified Ring Modulator/Filter Implementation", Conference on Lasers and Electro-Optics Technical Digest Series (Optica Publishing Group), 2022, 2 pgs., doi: 10.1364/CLEO_SI.2022.STh4K.3.
Liu et al., "Digital Signal Processing Techniques Enabling Multi-Tb/s Superchannel Transmission", IEEE Signal Processing Magazine, vol. 31, No. 2, Mar. 2014, pp. 16-24, doi: 10.1109/MSP.2013.2285934.
Liu et al., "Heterogeneous silicon widely-tunable lasers with monolithically integrated high-Q ring", Conference on Lasers and Electro-Optics (CLEO), paper SW4C.3, May 14-19, 2017, 2 pgs., doi: 10.1364/CLEO_SI.2017.SW4C.3.
Liu et al., "High-channel-count 20 GHz passively mode-locked quantum dot laser directly grown on Si with 4.1 Tbit/s transmission capacity", Optica, vol. 6, No. 2, Jan. 25, 2019, pp. 128-134, doi: 10.1364/OPTICA.6.000128.
DuPont™ Kapton®, Summary of Properties, Mar. 2012, 26 pgs.
"Cisco Global Cloud Index: Forecast and Methodology, 2015-2020", Cisco, White paper, 2016, 29 pgs.
"Cisco Introduces Foundation for Next-Generation Internet: The Cisco CRS-3 Carrier Routing System", Cisco, Mar. 9, 2010, Retrieved from internet: "<https://newsroom.cisco.com/c/r/newsroom/en/us/a/y2010/m03/cisco-introduces-foundation-for-next-generation-internet-the-cisco-crs-3-carrier-routing-system.html>", Retrieved on Sep. 2, 2025, 7 pgs.
"Cisco Visual Networking Index: Forecast and Methodology, 2016-2021", Cisco, White paper, Jun. 6, 2017, 17 pgs.
"Cisco Visual Networking Index: Forecast and Trends, 2017-2022", Cisco, White paper, 2019, 38 pgs.
"Crystal Quartz SiO2", Crystran, Retrieved from internet: <https://www.crystran.com/optical-materials/crystal-quartz-sio2>, Retrieved on Sep. 8, 2025, 2 pgs.
"Intel Demonstrates Industry-First Co-Packaged Optics Ethernet Switch", Intel Newsroom, Published on Mar. 5, 2020, Retrieved from internet: "<https://download.intel.com/newsroom/archive/2025/en-us-2020-03-05-intel-demonstrates-industryfirst-copackaged-optics-ethernet-switch.pdf>", Retrieved on Sep. 2, 2025, 6 pgs.
"PECVD Recipes—UCSB Nanofab Wiki", UCSB Nanofabrication Facility, Retrieved from: https://wiki.nanofab.ucsb.edu/wiki/PECVD_Recipes#ICP-PECVD_.28Unaxis_VLR.29, Retrieved on Jan. 13, 2025, 3 pgs.
Aaltonen et al., "Ruthenium Thin Films Grown by Atomic Layer Deposition", Chemical Vapor Deposition, vol. 9, No. 1, Jan. 13, 2003, pp. 45-49, doi: 10.1002/cvde.200290007.
Ahmed et al., "Tunable hybrid silicon nitride and thin-film lithium niobate electro-optic microresonator", Optics Letters, vol. 44, No. 3, Feb. 1, 2019, pp. 618-621, doi: 10.1364/OL.44.000618.
Alexander et al., "Nanophotonic Pockels modulators on a silicon nitride platform", Nature Communications, vol. 9, No. 1, Article 3444, Aug. 27, 2018, 6 pgs., doi: 10.1038/s41467-018-05846-6.
Allan, "Statistics of Atomic Frequency Standards", Proceedings of the IEEE, vol. 54, No. 2, Feb. 1966, pp. 221-230, doi: 10.1109/PROC.1966.4634.
Allan, "Time and Frequency (Time-Domain) Characterization, Estimation, and Prediction of Precision Clocks and Oscillators", IEEE Transactions on Ultrasonics, Ferroelectrics, and Frequency Control, vol. 34, No. 6, Nov. 1987, pp. 647-654, doi: 10.1109/T-UFFC.1987.26997.
Alnis et al., "Thermal-noise-limited crystalline whispering-gallery-mode resonator for laser stabilization", Physical Review A, vol. 84, No. 011804(R), Jul. 15, 2011, pp. 011804-1-011804-4, doi: 10.1103/PhysRevA.84.011804.
Andrae, "Total Consumer Power Consumption Forecast", Nordic Digital Business Summit, Oct. 5, 2017, 27 pgs.
Arbabi et al., "Measurements of the refractive indices and thermo-optic coefficients of Si3N4 and SiOx using microring resonances", Optics Letters, vol. 38, No. 19, Oct. 1, 2013, pp. 3878-3881, doi: 10.1364/OL.38.003878.
Audoin et al., "A Limit to the Frequency Stability of Passive Frequency Standards Due to an Intermodulation Effect", IEEE Transactions on Instrumentation and Measurement, vol. 40, No. 2, Apr. 1991, pp. 121-125, doi: 10.1109/tim.1990.1032896.
Ayazi et al., "Linearity of silicon ring modulators for analog optical links", Optics Express, vol. 20, No. 12, May 25, 2012, pp. 13115-13122, doi: 10.1364/OE.20.013115.
Balakier et al., "Integrated Semiconductor Laser Optical Phase Lock Loops", IEEE Journal of Selected Topics in Quantum Electronics, vol. 24, No. 1, Jan./Feb. 2018, 12 pgs., doi: 10.1109/JSTQE.2017.2711581.
Barron et al., "Thermal expansion, Gruneisen functions and static lattice properties of quartz", Journal of Physics C: Solid State Physics, vol. 15, No. 20, 1982, pp. 4311-4326, doi: 10.1088/0022-3719/15/20/016.
Baumgartel et al., "Frequency stability of a dual-mode whispering gallery mode optical reference cavity", Optics Express, vol. 20, No. 28, Dec. 21, 2012, pp. 29798-29806, doi: 10.1364/OE.20.029798.
Bauters et al., "Ultra-low-loss high-aspect-ratio Si3N4 waveguides", Optics Express. vol. 19, No. 4, Feb. 3, 2011, pp. 3163-3174, doi: 10.1364/oe.19.003163.
Behunin et al., "Fundamental noise dynamics in cascaded-order Brillouin lasers", Physical Review A, vol. 98, No. 023832, Aug. 17, 2018, pp. 023832-1-023832-17, doi: 10.1103/PhysRevA.98.023832.
Beloy et al., "Frequency ratio measurements at 18-digit accuracy using an optical clock network", Nature, vol. 591, No. 7851, Mar. 25, 2021, pp. 564-569, doi: 10.1038/s41586-021-03253-4.
Belt et al., "Ultra-Low-Loss Ta2O5-core/SiO2-Clad Planar Waveguides on Si Substrates", Optica, vol. 4, No. 5, May 9, 2017, pp. 532-536, doi: 10.1364/OPTICA.4.000532.
Beppu et al., "2048 QAM (66 Gbit/s) single-carrier coherent optical transmission over 150 km with a potential SE of 15.3 bit/s/Hz", Optics Express, vol. 23, No. 4, Feb. 17, 2015, pp. 4960-4969, doi: 10.1364/OFC.2014.W1A.6.
Bitou, "High-accuracy displacement metrology and control using a dual Fabry-Perot cavity with an optical frequency comb generator", Precision Engineering, vol. 33, No. 2, Apr. 2009, pp. 187-193, doi: 10.1016/j.precisioneng.2008.05.004.
Black, "An introduction to Pound-Drever-Hall laser frequency stabilization", American Journal of Physics, vol. 69, No. 1, Jan. 2001, pp. 79-87, doi: 10.1119/1.1286663.
Bloom et al., "An optical lattice clock with accuracy and stability at the 10-18 level", Nature, vol. 506, Jan. 22, 2014, pp. 71-75, doi: 10.1038/nature12941.
Blumenthal, "Photonic integration for UV to IR applications", APL Photonics, vol. 5, No. 2, Published Online Feb. 11, 2020, pp. 020903-1-020903-12, doi: 10.1063/1.5131683.
Blumenthal, "Ultra-Stable Integrated Lasers and Low-Cost, Low-Energy Coherent Data Center Interconnect", Advanced Photonics Congress, paper NeM4D.1, 2019, 2 pgs., doi: 10.1364/Networks.2019.NeM4D.1.

(56) References Cited

OTHER PUBLICATIONS

Blumenthal et al., "Frequency Stabilized Lasers for Coherent Fiber Interconnects in the Datacenter (Invited Talk)", IEEE Optical Interconnects Conference (OI), 2019, pp. 1-2, doi: 10.1109/OIC.2019.8714367.
Blumenthal et al., "Frequency-Stabilized Links for Coherent WDM Fiber Interconnects in the Datacenter", Journal of Lightwave Technology, vol. 38, No. 13, Jul. 1, 2020, pp. 3376-3386, doi: 10.1109/JLT.2020.2985275.
Blumenthal et al., "Integrated Photonics for Low-Power Packet Networking", IEEE Journal of Selected Topics in Quantum Electronics, vol. 17, No. 2, Mar./Apr. 2011, pp. 458-471, doi: 10.1109/JSTQE.2010.2077673.
Blumenthal et al., "Silicon Nitride in Silicon Photonics", Proceedings of the IEEE, vol. 106, No. 12, Dec. 2018, pp. 2209-2231, doi: 10.1109/JPROC.2018.2861576.
Bogaerts et al., "Silicon microring resonators", Laser & Photonics Reviews, vol. 6, No. 1, Jan. 2012, pp. 47-73, doi: 10.1002/lpor.201100017.
Bogdanov et al., "Material platforms for integrated quantum photonics", Optical Materials Express, vol. 7, No. 1, Jan. 1, 2017, pp. 111-132, doi: 10.1364/OME.7.000111.
Bongs et al., "Taking atom interferometric quantum sensors from the laboratory to real-world applications", Nature Reviews Physics, vol. 1, Oct. 28, 2019, pp. 731-739, doi: 10.1038/s42254-019-0117-4.
Bose et al., "250C Process for < 2dB/m Ultra-Low Loss Silicon Nitride Integrated Photonic Waveguides", Conference on Lasers and Electro-Optics, 2022, 2 pgs., doi: 10.1364/CLEO_SI.2022.SF3O.1.
Bose et al., "Anneal-free ultra-low loss silicon nitride integrated photonics", Light: Science & Applications, vol. 13, Article 156, Jul. 8, 2024, 13 pgs., doi: 10.1038/s41377-024-01503-4.
Boshier et al., "External-cavity frequency-stabilization of visible and infrared semiconductor lasers for high resolution spectroscopy", Optics Communications, vol. 85, No. 4, Sep. 15, 1991, pp. 355-359, doi: 10.1016/0030-4018(91)90490-5.
Boust et al., "Microcomb Source Based on InP DFB / Si3N4 Microring Butt-Coupling", Journal of Lightwave Technology, vol. 38, No. 19, Oct. 1, 2020, pp. 5517-5525, doi: 10.1109/jlt.2020.3002272.
Braginsky et al., "Thermodynamical fluctuations and photo-thermal shot noise in gravitational wave antennae", Physics Letters A, vol. 264, No. 1, Dec. 13, 1999, pp. 1-10, doi: 10.1016/S0375-9601(99)00785-9.
Briles et al., "Generating Octave-Bandwidth Soliton Frequency Combs with Compact Low-Power Semiconductor Lasers", Physical Review Applied, vol. 14, Article 014006, Jul. 2, 2020, pp. 014006-1-014006-10, doi: 10.1103/PhysRevApplied.14.014006.
Brodnik et al., "Optically synchronized fibre links using spectrally pure chip-scale lasers", Nature Photonics, vol. 15, No. 8, Aug. 2021, pp. 588-593, doi: 10.1038/s41566-021-00831-w.
Burns et al., "Observation of noncritically phase-matched second-harmonic generation in an optical waveguide", Applied Physics Letters, vol. 24, No. 5, Mar. 1, 1974, pp. 222-224, doi: 10.1063/1.1655160.
Calonico et al., "High-accuracy coherent optical frequency transfer over a doubled 642-km fiber link", Applied Physics B, vol. 117, Sep. 4, 2014, pp. 979-986, doi: 10.1007/s00340-014-5917-8.
Cetinorgu et al., "Mechanical and thermoelastic characteristics of optical thin films deposited by dual ion beam sputtering", Applied Optics, vol. 48, No. 23, Aug. 10, 2009, pp. 4536-4544, doi: 10.1364/AO.48.004536.
Chacinski et al., "Impact of Losses in the Bragg Section on the Dynamics of Detuned Loaded DBR Lasers", IEEE Journal of Quantum Electronics, vol. 46, No. 9, Sep. 2010, pp. 1360-1367, doi: 10.1109/JQE.2010.2048013.
Chauhan et al., "Photonic Integrated Si3N4 Ultra-Large-Area Grating Waveguide MOT Interface for 3D Atomic Clock Laser Cooling", Conference on Lasers and Electro-Optics, 2019, 2 pgs., doi: 10.1364/CLEO_SI.2019.STu4O.3.
Chauhan et al., "Ultra-Low Loss 698 nm and 450 nm Silicon Nitride Visible Wavelength Waveguides for Strontium Atomic Clock Applications", Conference on Lasers and Electro-Optics, paper STh1J.2, 2020, 2 pgs., doi: 10.1364/CLEO_SI.2020.STh1J.2.
Chauhan et al., "Ultra-low loss visible light waveguides for integrated atomic, molecular, and quantum photonics", Optics Express, vol. 30, No. 5, Feb. 28, 2022, pp. 6960-6969, doi: 10.1364/OE.448938.
Chauhan et al., "Visible light photonic integrated Brillouin laser", Nature Communications, vol. 12, No. 1, Article 4685, Aug. 3, 2021, 8 pgs., doi: 10.1038/s41467-021-24926-8.
Chen et al., "Highly linear ring modulator from hybrid silicon and lithium niobate", Optics Express, vol. 23, No. 10, May 12, 2015, pp. 13255-13264, doi: 10.1364/OE.23.013255.
Chen et al., "Planar-integrated magneto-optical trap", arXiv:2107.07367v1, Jul. 15, 2021, 5 pgs.
Chiles et al., "Deuterated silicon nitride photonic devices for broadband optical frequency comb generation", Optics Letters, vol. 43, No. 7, Apr. 1, 2018, pp. 1527-1530, doi: 10.1364/OL.43.001527.
Chrostowski et al., "Silicon Photonics Design: From Devices to Systems", Cambridge University Press, Mar. 2015, 439 pgs., doi: 10.1017/cbo9781316084168.
Clivati et al., "A Coherent Fiber Link for Very Long Baseline Interferometry", IEEE Transactions on Ultrasonics Ferroelectrics and Frequency Control, vol. 62, No. 11, Nov. 2015, pp. 1907-1912, doi: 10.1109/TUFFC.2015.007221.
Cole et al., "Higher-Order Modulation for Client Optics", IEEE Communications Magazine, vol. 51, No. 3, Mar. 2013, pp. 50-57, doi: 10.1109/MCOM.2013.6476865.
Corato-Zanarella et al., "Widely tunable and narrow-linewidth chip-scale lasers from near-ultraviolet to near-infrared wavelengths", Nature Photonics, vol. 17, 2023, pp. 157-164, doi: 10.1038/s41566-022-01120-w.
Corbett et al., "Spanner: Google's Globally-Distributed Database", USENIX Association, 10th USENIX Symposium on Operating Systems Design and Implementation (OSDI '12), 2012, pp. 251-264.
Crasovan et al., "Optical Dyakonov surface waves at magnetic interfaces", Optics Letters, vol. 30, No. 22, Nov. 15, 2005, pp. 3075-3077, doi: 10.1364/OL.30.003075.
Crivelli et al., "Architecture of a Single-Chip 50 Gb/s DP-QPSK/BPSK Transceiver With Electronic Dispersion Compensation for Coherent Optical Channels", IEEE Transactions on Circuits and Systems—I: Regular Papers, vol. 61, No. 4, Apr. 2014, pp. 1012-1025, doi: 10.1109/TCSI.2013.2283673.
Dallyn et al., "Thermal and driven noise in Brillouin lasers", Physical Review A, vol. 105, No. 4, Article 043506, Apr. 11, 2022, 14 pgs., doi: 10.1103/PhysRevA.105.043506.
Davila-Rodriguez et al., "Compact, thermal-noise-limited reference cavity for ultra-low-noise microwave generation", Optics Letters, vol. 42, No. 7, Apr. 1, 2017, pp. 1277-1280, doi: 10.1364/OL.42.001277.
De Heyn et al., "Fabrication-Tolerant Four-Channel Wavelength-Division-Multiplexing Filter Based on Collectively Tuned Si Microrings", Journal of Lightwave Technology, vol. 31, No. 16, Aug. 15, 2013, pp. 2785-2792, doi: 10.1109/JLT.2013.2273391.
Debut et al., "Linewidth narrowing in Brillouin lasers: Theoretical analysis", Physical Review A, vol. 62, No. 2, Jul. 14, 2000, pp. 023803-1-023803-4, doi: 10.1103/PhysRevA.62.023803.
Degen et al., "Quantum sensing", Reviews of Modern Physics, vol. 89, No. 035002, Jul.-Sep. 2017, pp. 035002-1-035002-39, doi: 10.1103/RevModPhys.89.035002.
Del'Haye et al., "Laser-machined ultra-high-Q microrod resonators for nonlinear optics", Applied Physics Letter, vol. 102, No. 22, Jun. 7, 2013, pp. 221119-1-221119-4, doi: 10.1063/1.4809781.
Del'Haye et al., "Optical frequency comb generation from a monolithic microresonator", Nature, vol. 450, No. 7173, Dec. 20, 2007, pp. 1214-1217, doi: 10.1038/nature06401.

(56) References Cited

OTHER PUBLICATIONS

Derr et al., "Coherent Optical QPSK Intradyne System: Concept and Digital Receiver Realization", Journal of Lightwave Technology, vol. 10, No. 9, Sep. 1992, pp. 1290-1296, doi: 10.1109/50.156881.
Di Domenico et al., "Simple approach to the relation between laser frequency noise and laser line shape", Applied Optics, vol. 49, No. 25, Sep. 1, 2010, pp. 4801-4807, doi: 10.1364/AO.49.004801.
Dick, "Local Oscillator Induced Instabilities in Trapped Ion Frequency Standards", Proceedings of the 19th Annual Precise Time and Time Interval Systems and Applications Meeting, Dec. 1987, pp. 133-147.
Dierikx et al., "White Rabbit Precision Time Protocol on Long-Distance Fiber Links", IEEE Transactions on Ultrasonics, Ferroelectrics, and Frequency Control, vol. 63, No. 7, Jul. 2016, pp. 945-952, doi: 10.1109/TUFFC.2016.2518122.
Dong et al., "High-speed programmable photonic circuits in a cryogenically compatible, visible-near-infrared 200 mm CMOS architecture", Nature Photonics, vol. 16, No. 1, Jan. 2022, pp. 59-65, doi: 10.1038/s41566-021-00903-x.
Dong et al., "Observation of fundamental thermal noise in optical fibers down to infrasonic frequencies", Applied Physics Letters, vol. 108, No. 2, Jan. 12, 2016, pp. 021108-1-021108-4, doi: 10.1063/1.4939918.
Drever et al., "Laser Phase and Frequency Stabilization Using an Optical Resonator", Applied Physics B, vol. 31, Jun. 1983, pp. 97-105, doi: 10.1007/BF00702605.
Duan, "General treatment of the thermal noises in optical fibers", Physical Review A, vol. 86, No. 023817, Aug. 9, 2012, pp. 023817-1-023817-8, doi: 10.1103/PhysRevA.86.023817.
Duan, "Intrinsic thermal noise of optical fibres due to mechanical dissipation", Electronics Letters, vol. 46, No. 22, Oct. 28, 2010, pp. 1515-1516, doi: 10.1049/el.2010.1653.
Eggleton et al., "Brillouin integrated photonics", Nature Photonics, vol. 13, No. 10, Aug. 19, 2019, pp. 664-677, doi: 10.1038/s41566-019-0498-z.
Elshaari et al., "Hybrid integrated quantum photonic circuits", Nature Photonics, vol. 14, No. 5, Apr. 13, 2020, pp. 285-298, doi: 10.1038/s41566-020-0609-x.
Elshaari et al., "Thermo-Optic Characterization of Silicon Nitride Resonators for Cryogenic Photonic Circuits", IEEE Photonics Journal, vol. 8, No. 3, Article 2701009, Jun. 2016, 9 pgs., doi: 10.1109/JPHOT.2016.2561622.
Ely et al., "Using the Deep Space Atomic Clock for Navigation and Science", IEEE Transactions on Ultrasonics, Ferroelectrics, and Frequency Control, vol. 65, No. 6, Jun. 2018, pp. 950-961, doi: 10.1109/TUFFC.2018.2808269.
Epping et al., "Ultra-low-power stress-optics modulator for microwave photonics", Proceedings of SPIE, Integrated Optics: Devices, Materials, and Technologies XXI, vol. 10106, Feb. 16, 2017, pp. 101060F-1-101060F-8, doi: 10.1117/12.2266170.
Estep et al., "Magnetic-free non-reciprocity and isolation based on parametrically modulated coupled-resonator loops", Nature Physics, vol. 10, No. 12, Nov. 10, 2014, pp. 923-927, doi: 10.1038/nphys3134.
Everhardt et al., "Ultra-low power stress-based phase actuation in TriPlex photonic circuits", Proceedings of SPIE, Integrated Optics: Devices, Materials, and Technologies XXVI, vol. 12004, Mar. 5, 2022, pp. 1200405-1-1200405-7, doi: 10.1117/12.2609405.
Fadley, "X-ray photoelectron spectroscopy: Progress and perspectives", Journal of Electron Spectroscopy and Related Phenomena, vol. 178-179, May 2010, pp. 2-32, doi: 10.1016/j.elspec.2010.01.006.
Fan et al., "Hybrid integrated InP—Si3N4 diode laser with a 40-Hz intrinsic linewidth", Optics Express, vol. 28, No. 15, Jul. 20, 2020, pp. 21713-21728, doi: 10.1364/OE.398906.
Fang et al., "Generalized non-reciprocity in an optomechanical circuit via synthetic magnetism and reservoir engineering", Nature Physics, vol. 13, No. 5, Published online Jan. 16, 2017, pp. 465-471, doi: 10.1038/nphys4009.
Fatadin et al., "Laser Linewidth Tolerance for 16-QAM Coherent Optical Systems Using QPSK Partitioning", IEEE Photonics Technology Letters, vol. 22, No. 9, May 1, 2010, pp. 631-633, doi: 10.1109/LPT.2010.2043524.
Fescenko et al., "Dual-mode temperature compensation technique for laser stabilization to a crystalline whispering gallery mode resonator", Optics Express, vol. 20, No. 17, Aug. 6, 2012, pp. 19185-19193, doi: 10.1364/OE.20.019185.
Flamini et al., "Photonic quantum information processing: a review", Reports on Progress in Physics, vol. 82, No. 016001, 2019, 32 pgs., doi: 10.1088/1361-6633/aad5b2.
Foreman et al., "Coherent Optical Phase Transfer over a 32-km Fiber with 1 s Instability at 10-17", Physical Review Letters, vol. 99, No. 15, Oct. 12, 2007, pp. 153601-1-153601-4, doi: 10.1103/PhysRevLett.99.153601.
Frigg et al., "Low loss CMOS-compatible silicon nitride photonics utilizing reactive sputtered thin films", Optics Express, vol. 27, No. 26, Dec. 23, 2019, pp. 37795-37805, doi: 10.1364/OE.380758.

* cited by examiner

| Beam delivery method | Beam delivery | Beam properties | Trapping beam overlap volume | Beam delivery distance [a] | Number of retroflectors | Optical access [b] | Atom number |
|---|---|---|---|---|---|---|---|
| Conventional MOT[31] | Six free-space (FS) beams | Collimated Gaussian beams, diameters ~30mm | $\sim 10^4 mm^3$ | N/A | 3 | 5 | $\sim 10^8$ |
| Diffraction grating MOT[31] | Fiber input, one collimated beam and 3 diffracted beams | Input FS beam 20 mm diameter | $10^4 mm^3$ | 16cm | 0 | 3-4 | $6x10^7$ |
| 90° Pyamid[39] | Fiber input, one collimated beam and 5 reflected beams | Input FS beam 4.2 mm diameter | $10\ mm^3$ | 3cm | 0 | 0 | $10^4$ |
| PIC emitter, MS, GMOT[37] | Fiber input, one PIC-delivered beam and 3 diffracted beams | Diverging beam after MS, Diameter 20 mm, flat-top | $340\ mm^3$ | 15cm | 0 | 3 | $3x10^6$ |
| SiN beam delivery PiC (this work) | Fiber input, three PIC-delivered beams | Collimated, 2.5 x 3.5 $mm^2$, uniform intensity | $22\ mm^3$ | 4cm | 3 | 4-5 | $1.3x10^6$ |

*FIG. 10*

PHOTONIC INTEGRATED BEAMLINES FOR 3D MAGNETO-OPTICAL TRAP

CROSS REFERENCE TO RELATED APPLICATIONS

The current application claims the benefit of and priority under 35 U.S.C. § 119(e) to U.S. Provisional Patent Application No. 63/387,662 filed Dec. 15, 2022, the disclosure of which is herein incorporated by reference in its entirety for all purposes.

FIELD OF THE INVENTION

The present invention generally relates to photonic integrated beamlines. It is more particularly related to photonic beamlines for 3D magneto-optical traps.

BACKGROUND

Often, table-top sized precision lasers and optics can be employed for visible light atomic applications such as optical atomic clocks, precision spectroscopy, metrology, atomic sensors, and quantum information sciences and applications. For example, atomic, molecular and optic (AMO) applications can sometimes rely on racks of lasers and table-sized optics to perform spectroscopy, to trap and cool, manipulate, and/or probe single and/or multiple atoms, ions, molecules and/or quantum gates. Diffraction grating MOTs are an example of a non-integrated bulk-optic technology.

Cold atoms can be important for precisions atomic applications including time-keeping and sensing. Magneto-optical traps can be used to produce cold atoms. MOTs are generally apparatuses that use laser cooling and spatially varying magnetic fields to trap cold neutral atoms. A 3-dimensional MOT (3DMOT) uses the intersection of many spatially-varying magnetic fields and six laser beams. The trapped atoms will often be centered at a field zero located central to the magnetic field generators. Other MOT configurations are also used to slow and trap atoms, including 1D and 2D MOTs.

When atoms travel away from the field zero of a 3D trap, a spatially-varying Zeeman shift can bring an atomic transition into resonance resulting in a scattering force (e.g., from the lasers) that tends to push the atoms back to the center of the trap. The scattering force tends to act on the atoms in the opposite direction of their motion, and therefore cools the atoms. Generally, a MOT cloud must be formed in vacuum chamber, otherwise the ambient pressure can prevent cloud formation.

SUMMARY OF THE INVENTION

In some embodiments, the techniques described herein relate to a photonic integrated circuit with a beamline. In an embodiment, the photonic integrated circuit including: at least one laser with a first optical frequency related to a first at least one atomic transition, the at least one laser pre-stabilized to a at least one frequency reference, wherein the at least one laser is locked to the at least one frequency reference; at least one photodiode and at least one feedback control circuit for locking the at least one laser to the at least one frequency reference; at least one frequency shifter or laser frequency control for stabilizing the at least one laser to the frequency reference, and wherein the pre-stabilized laser is then locked to the at least one atomic transition; and at least one output coupling grating for communicating the at least laser to a target.

In another embodiment, the target is selected from a list consisting of an at least one atom in an atomic cell, an at least one ion in an ion trap, and a molecule in a vacuum cell.

In another further embodiment, the frequency reference is selected from the group consisting of an atomic frequency reference and an optical cavity frequency reference.

In yet another embodiment, the output coupling grating is used can be used to form a lattice trap.

In still another embodiment, the output coupling grating is used to form an optical tweezer.

In another embodiment again, the photonic integrated circuit further including a second output coupling grating and a third output coupling grating, wherein the at least one laser is coupled to the three output coupling gratings, and wherein the three output coupling gratings are arranged to intersect at a common point inside an atomic cell.

In another embodiment again, the at least one laser is modulated to be locked to the at least one frequency reference.

In yet still another embodiment, the target is selected from the group consisting of a vapor cell, an ion trap, a vacuum cell, 1D MOT, a 2D MOT, and a 3D MOT.

In yet another embodiment again, the laser frequency is matched to a transition selected from the group including virtual atomic transitions multi-photon transitions, direct transitions, and indirect transitions.

In yet still another embodiment again, the laser optical frequency is selected from a list consisting of Deep UV, UV, near UV, Visible, Near IR, Mid IR and IR wavelengths.

In another further embodiment, the at least one laser, photodiode, frequency shifter, and output coupling grating are integrated to an integrated circuit using a material selected from a group consisting of silicon nitride, tantalum pentoxide, alumina nitride, and alumina oxide.

In another further embodiment again, a quarter waveplate is located directly above each output coupling grating.

In yet another further embodiment, the at least one output coupling grating is configured to emit polarization selected from the group consisting of circular polarization, elliptical polarization and engineered degrees of polarization.

In yet still another further embodiment, the at least one output coupling grating is configured to emit intensity profiles selected from the group consisting of flat top, gaussian, and engineered intensity profiles.

In another additional embodiment, the photonic integrated circuit is CMOS foundry compatible $Si_3N_4$ waveguide circuit, and wherein during manufacturing a set of relative positions of the output coupling gratings are fixed.

In still another additional embodiment, the photonic integrated circuit further including a repump laser and a cooling laser, and wherein the repump laser and the cooling laser are locked to a second frequency reference and a third frequency reference respectively.

In another additional embodiment again, the repump laser, cooling laser, and the at least one laser are output from a common output coupling grating.

In several embodiments, the techniques described herein relate to a photonic integrated circuit forming part of an ion trap. In an embodiment, the photonic integrated circuit including: at least one laser with an optical frequency matched to at least one atomic transition, the at least one laser pre-stabilized to the at least one atomic transition, wherein pre-stabilization of the laser to the at least one atomic transition uses at least one frequency reference, wherein the at least one laser is modulated for locking to the at least frequency reference, and wherein the at least one laser is modulated for locking to the at least one atomic transition; and at least one photodiode and at least one feedback control circuit for locking the at least one laser to the at least one frequency reference.

In several embodiments, the techniques described herein relate to a photonic integrated circuit forming part of a molecular trap. In an embodiment, the photonic integrated circuit including: at least one laser with an optical frequency matched to at least one atomic transition, the at least one laser pre-stabilized to the at least one atomic transition, wherein pre-stabilization of the laser to the at least one atomic transition uses at least one frequency reference, wherein the at least one laser is modulated for locking to the at least frequency reference, and wherein the at least one laser is modulated for locking to the at least one atomic transition; at least one photodiode and at least one feedback control circuit for locking the at least one laser to the at least one frequency reference; and three output coupling gratings, wherein the three output coupling gratings are mounted on a photonic integrated circuit around a circumference with a spacing of around 120 degrees, and wherein each grating emitter is etched to emit free-space beams at a selected angle; wherein the selected angle results in a set of free-space beams intersecting at a location inside an atomic cell.

In yet still another further embodiment, the circumference and the selected angle are such that all the free-space beams from the three output coupling gratings enter the atomic cell through at least one wall of the atomic cell.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 10 conceptually illustrates a comparison of different example integrated MOT beam delivery platforms and their performance.

DETAILED DESCRIPTION

Figure 1:
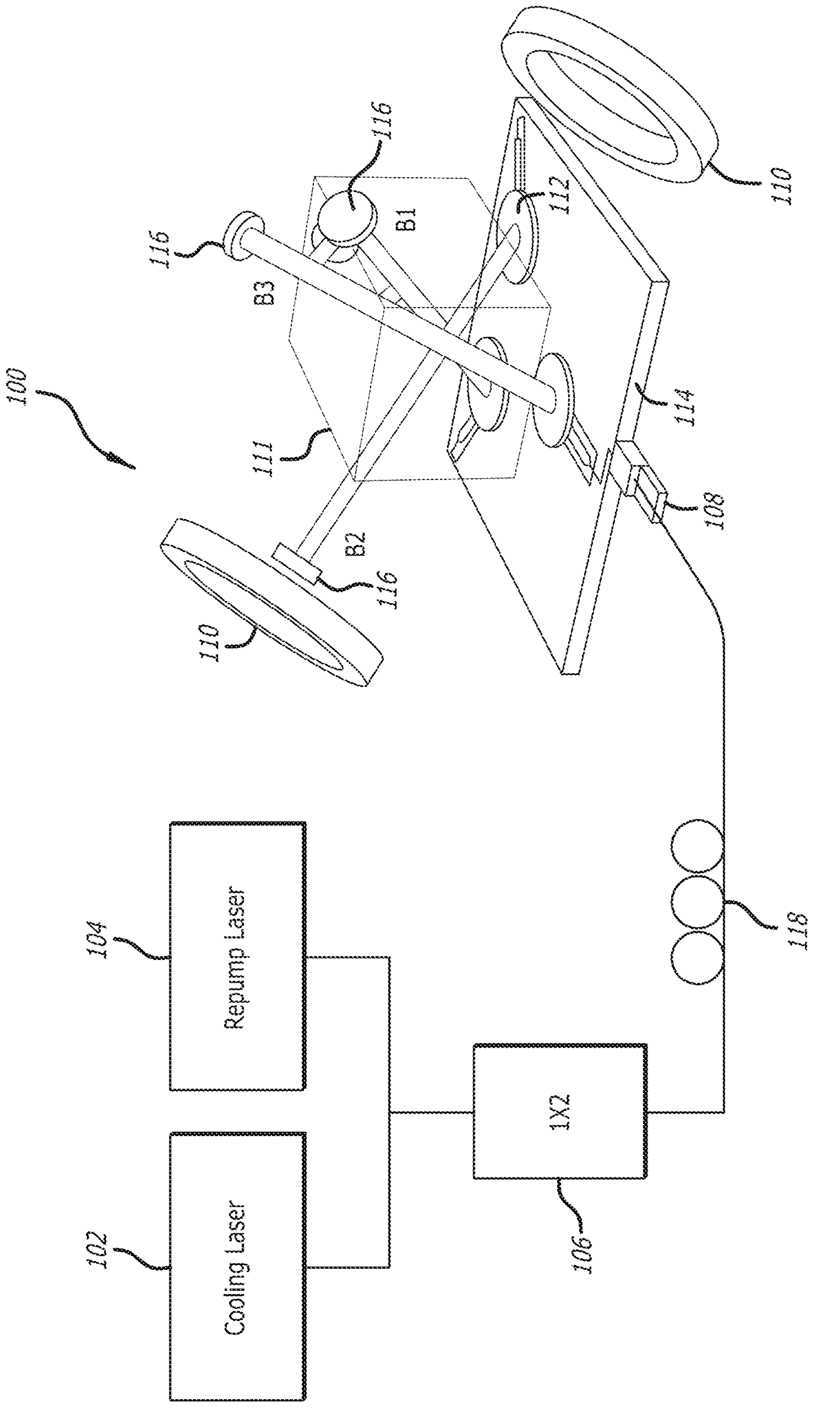
FIG. 1 conceptually illustrates an example laser cooling beam delivery PIC configured in a 3D-MOT.

Laser cooling and trapping of atoms (e.g., $^{87}$Rb atoms) in a 3D-MOT can be achieved using a photonic integrated fiber-coupled photonic chip in accordance with various embodiments of the invention. Other beams may be used in addition to cooling and repumping, for example atom interrogation and optical transition or clock readout. In general MOTs are used with neutral species atoms, but cooling and trapping of ions and molecules can also be performed. The photonic chip can deliver cooling and repump beams, as well as other beams, directly to a rubidium atomic cell. Other atomic, ion, or molecular species are also possible, including a mixture of atomic, ion, and molecular species. A photonic integrated circuit (PIC) can enable a 3DMOT photonic integrated circuit and can be a CMOS foundry compatible Si3N4 waveguide circuit. It can provide fiber coupling, beam expansion, collimation, and/or atomic cell beam delivery and other functions required for MOTs and atomic, ion, and molecular systems and for AMO in general.

Cold atoms can be central to precision atomic applications including timekeeping and sensing. In general, atoms, ions, molecules, and combinations can be used for precision scientific experiments and applications. In various embodiments, 3D magneto-optical traps (3D-MOT) can be used to produce clouds of cold atoms, ions and molecules. 3D-MOTs can be improved with photonic waveguide integration, which can improve reliability and reduce size, weight, and cost. Photonic integration can also improve performance of the MOT by providing phase and optical stability as well as precision laser and optical performance. In many embodiments, 3D-MOTs can require the delivery of multiple, large area, and/or collimated laser beams to an atomic vacuum cell. Atomic vacuum cells can also be referred to a vapor cells and/or atomic cells. In several embodiments, magneto-optical traps (MOTs) can be designed to cool and trap various species of atoms, for example rubidium ($^{87}$Rb). MOTs designed to cool and trap various species of atoms can be advantageous for various types of cold atom sensors. In numerous embodiments, an $^{87}$Rb 3D-MOT can use a fiber-coupled photonic integrated circuit to deliver all necessary beams to cool and trap more than $1\times10^6$ atoms to around near 200 μK in the trapping volume. In several embodiments the trapping volume can be an order of magnitude smaller than that of an equivalent atom number diffraction grating MOT. Diffraction grating MOTs are an example of non-integrated bulk-optic technology. Lower temperatures may be reached by introducing other lasers and beams with the photonic integrated circuit to cool atoms to sub-doppler temperatures, for example 20 μk in the trapping volume. Lower temperatures may be used in applications such as Bose-Einstein Condensates (BEC) and atom interferometry. Other grating types may be desirable and required, for examples gratings for lattice trap beam delivery, gratings for Raman cooling beams, gratings for optical tweezers. Optical tweezers and equivalent techniques can be used to trap individual and/or small groups of atoms, ions, particles and/or molecules with optical forces.

In accordance with embodiments of the invention, a silicon nitride photonic integrated circuit can transform fiber-coupled 780 nm cooling and repump light delivered from lasers to chip waveguides (e.g., photonic integrated chip mounted waveguides). Other wavelengths can be delivered as required by the specific atomic or molecular species.

For example neutral strontium can require 461 nm, 816 nm, 689 nm, 679 nm, 707 nm, and 728 nm for cooling, magic lattice, repumping, and the optical clock transition. Trapped strontium ion can require 422 nm, 461 nm, 405 nm, and 674 nm for cooling and the optical clock transition. Chip integrated waveguides can, via transforming waveguides and/or waveguide gratings, convert delivered cooling and repump light to three orthogonal non-diverging free-space cooling and repump beams (e.g., 2.5 mm×3.5 mm free-space cooling and repump beams) in accordance with many embodiments of the invention. Other beam configurations are possible and may be desirable. In various embodiments, the three orthogonal non-diverging free-space cooling and repump beams can be directly interfacing to the rubidium cell in order to cool and trap the atoms. In some embodiments, a fully planar, CMOS foundry-compatible integrated beam delivery photonic integrated circuit can mount waveguides and emitters for providing cooling and/or repump beams to a atomic cell. In some embodiments, a photonic integrated circuit can include lasers and modulators, for system-on-chip solutions for cold atom applications. Throughout this specification, organizing a set of lasers and optical components along a path from the laser to the atoms can be referred to as a beamline.

In accordance with various embodiments of the invention, photonic integration can improve the reliability, reduce the cost, reduce the size, and/or enable scalability, of precision lasers and/or optics. In accordance with various embodiments of the invention, integration can provide performance improvements, such as phase stability, over lab-scale, table-top, rack mount and discrete systems. In several embodiments, photonic integration can be employed for visible light atomic applications such as optical atomic clocks, precision spectroscopy, precision metrology, atomic sensors, and/or quantum information sciences and/or applications.

In several embodiments, Cold atoms can be a central component of precision scientific tools including atomic clocks and ultra-high-resolution spectroscopy. Cold atoms can form the basic building blocks for applications such as atomic timekeeping, quantum computing, and quantum sensing by enabling improved spectroscopy resolution for observing the quantum behavior of atoms. Today's atom trapping and cooling systems employ free-space lasers and optics that occupy tables and racks and are costly and power consuming. In several embodiments, these systems are realized at the chip-scale. In accordance with various embodiments of the invention a complementary oxide semiconductor (CMOS) foundry-compatible photonic integrated circuit (PICs) process can improve their reliability, lower their cost, and enable portability and new cold-atom systems for applications such as mobile gravity mapping and space-based atomic clocks. In particular, many aspects of this disclosure relate to the miniaturization and/or chip integration of magneto-optical traps.

In several embodiments, three-dimensional magneto-optical traps (3D-MOTs), can be used to directly create a large population of trapped and cooled atoms. Three-dimensional magneto-optical traps can be formed inside a vacuum environment using a balance of optical radiation forces via six cooling laser beams and a magnetic field gradient with a null located at the beam intersection of the laser cooling beams. In many embodiments, the trapped atom number in a 3D-MOT scales strongly with the beam diameter. Beam diameters of at least 1 mm are often needed to trap and cool over 1 million cold atoms in accordance with several embodiments.

An example laser cooling beam delivery PIC configured in a 3D-MOT is conceptually illustrated in FIG. 1. A photonic integrated circuit magneto-optical trap (PICMOT) 100 can include cooling laser 102 and repump laser 104. The MOT laser light can be generated with two independent lasers, cooling laser 102 (780.241 nm) and repump laser 104 (780.228 nm). The cooling laser 102 and the repump laser 104 can be combined using a fiber directional coupler 106. The cooling laser 102 and the repump laser 104 can be packaged using epoxy to the PIC input waveguide 108. Two current-carrying anti-Helmholtz coils 110 can be aligned along one beam axis as shown to form a quadrupole magnetic field with a null at the beam intersection within the atomic cell 111. Quarter waveplates 112 (QWPs) can be mounted directly above each to three grating emitters. The QWPs 112 can be rotated such that the circular polarization handedness of beams B1 and B3 are opposite to that of B2. Three retroreflectors 116, each containing a mirror and a quarter waveplate can be used to produce the other three of the six MOT trapping beams with the correct polarization states. Polarization control is provided by the polarization control 118.

In many embodiments, cooling and repump lasers can be combined in a fiber coupler and/or can be connected to the PIC fiber input. Polarization can be adjusted with a polarization controller. A quarter waveplate (QWP) holder layer can be placed on the PIC in several embodiments. In other embodiments, polarization optics can be incorporated directly into the photonic integrated chip, or the grating design itself, using for example metasurface gratings. Stray-light filtering layers can be positioned above the QWP holder in accordance with embodiments of the invention or incorporated directly into the PIC. The PIC can be positioned under the glass cell containing the rubidium atoms, bonded to the atomic cell, or incorporated directly as a wall of the atomic cell. The magnetic field coils can be aligned along at least one beam in accordance with many embodiments of the invention. Retro-reflector mirror mounts can be mounted above the atomic cell and/or can be used to overlap the counter-propagating beams. In certain embodiments, metasurfaces or other designs can be used to realized the retro-reflector. In certain embodiments, metasurfaces or other retroreflecting designs can be incorporated directly into the atomic cell or placed inside the atomic cell. In accordance with many embodiments, an output coupling grating can be configured to emit polarization selected from the group consisting of circular polarization, elliptical polarization and engineered degrees of polarization. Engineered degrees of polarization can be those polarizations selected for a particular application as would be well understood by one skilled in the art. An output coupling grating can be configured to emit intensity profiles selected from the group consisting of flat top, gaussian, and engineered intensity profiles. Engineered intensity profiles can be those intensity profiles selected for a particular application as would be well understood by one skilled in the art.

In accordance with various embodiments of the invention, PICs can deliver non-diverging cooling and repump beams that intersect at a height (e.g., a height of around 9.45 mm) above the PIC surface. This can allow the PIC to be located below a vacuum cell as part of a PICMOT. It can be beneficial for providing a compact configuration. An example of a vacuum cell may be a ColdQuanta™ rubidium miniMOT. In various embodiments, the PIC delivers all beams through the same glass wall of the vacuum cell. This can be beneficial to reduce the size of the PICMOT. Typically, 3D-MOTs deliver one beam per glass wall. In accordance with several embodiments of the invention, stray reflections and/or higher order modes are reduced using a matte-black aluminum foil baffle layer above the quarter wave plates. Retroreflector mirrors can be aligned above the cell to form overlapping counter-propagating beams, in many embodiments. In accordance with embodiments of the invention, a magnetic field can be set by adjusting the relative current in each of a set of coils and/or by using external magnets for field-shimming.

In several embodiments a PIC can include laser cooling delivery to a MOT. An example layout of a laser cooling beam delivery PIC used to generate free-space beams for a 3D MOT is conceptually illustrated in FIG. 2. A PIC 200 can include a waveguide 201, a splitter 204, mode expanders 206, and grating emitters 207. Fiber-coupled light 202 received to the waveguide 201 can be guided to a splitter 204 (e.g., a 1×3 multimode interference (MMI) waveguide splitter). The splitter 204 convey the light into three waveguides 205 and each waveguide 205 can lead to a one of three mode expanders 206 (e.g., slab waveguide beam expanders). Each mode expander 206 can provide the light to a grating emitter 207. The grating emitter 207 can project a free-space beam at a preselected angle. The grating emitters 207 can be positioned around a circumference and can be spaced from each other by around 120 degrees. The preselected angle and circumference of the grating emitters 207 can be such that the emitted beams B1, B2, B3 overlap at a location inside a vacuum cell 212. Mode expanders and grating emitters are discussed in greater detail elsewhere herein. Bulk quarter waveplates 208 can be positioned above each grating emitter 207. The dashed rectangle 210 represents the height at which the beam profile is imaged and those images are further discussed elsewhere herein. The grating emitters 207 (e.g., surface grating emitters) can each be positioned around a circumference (e.g., with 120 degree spacing around a circumference). In some embodiments the circumference can measure around 13.5 mm. The beams B1, B2, and B3, can all enter the vacuum cell 212 through a bottom side of the vacuum cell 212. The bottom side of the vacuum cell 212 can be the side closest to the PIC 200. In several embodiments, vacuum cells can be positioned around 9 mm above corresponding PICs. In several embodiments, retro reflectors and anti-Helmholtz coils can be positioned around the cell (e.g., as depicted in FIG. 1). In accordance with many embodiments, the relative positions of each of the beam emitters can be fixed at the time of manufacture since the beam emitters form part of the PIC. Manufacturing processes are described in greater detail elsewhere herein.

Figure 2:
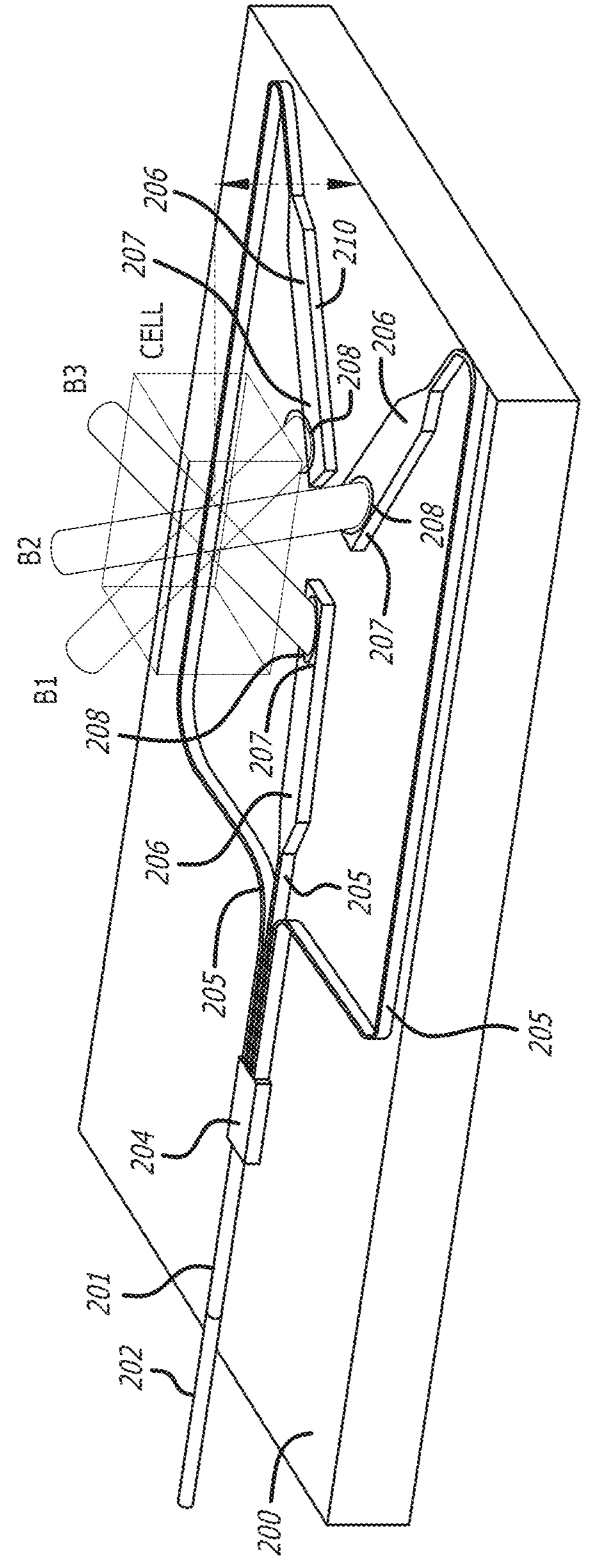
FIG. 2 conceptually illustrates an example layout of a laser cooling beam delivery PIC used to generate free-space beams for a 3D MOT.

In accordance with several embodiments of the invention a 3D-MOT beam delivery PIC can be based on a low-loss Si3N4 core and/or a SiO2 cladding single mode waveguide. The single mode waveguide can be designed to operate at 780 nm. In various embodiments, the cooling and repump laser light can be coupled via a single mode optical fiber to a single mode waveguide at the PIC input (e.g., as shown in FIG. 2). In several embodiments, the fiber-coupled input can be waveguided to a 1×3 multimode interference (MMI) waveguide splitter. From a splitter, each output can be routed to one of three slab waveguide beam expanders. Slab waveguide beam expanders can each uniformly illuminate one of three large-area surface grating emitters (e.g., grating emitter 207). The grating emitter free-space collimated beams can be designed to cool a large volume of atoms (e.g., rubidium atoms) as well as provide a good beam intensity uniformity. In many embodiments, the grating centers can be positioned on a 13.5 mm diameter circle. In accordance with several embodiments, each grating center can emit a collimated beam at an angle of around 57° from the PIC surface normal. This angle of emission (e.g., as shown in FIG. 2) towards the circle center, can produce around a 93° intersection between all three beams at a point around 9.45 mm above the chip surface. In numerous embodiments, the output of each grating emitter is linearly polarized. Individual quarter waveplates (e.g., 10 mm diameter quarter waveplates) can be located directly above each grating emitter to convert the beam to a circular polarization in accordance with embodiments of the invention. In some embodiments, circular polarization is required for generating the MOT.

In some embodiments, a PIC transforms fiber-coupled 780 nm cooling and repump light into a number of (e.g., three) beams. In many embodiments the beams can have dimensions of around 2.5 mm×3.5 mm. In some embodiments the beams can be collimated beams, and/or free-space beams. A beam overlap volume (e.g., of around 22 $mm^3$) can be produced inside an atomic cell at a height (e.g., 9 mm) above the PIC surface, in accordance with embodiments of the invention.

In several embodiments a PIC delivery interface can produce a MOT cloud of ~$1\times10^6$ atoms and a temperature near 200 μK. In some embodiments, the PIC supports delivery of intensities of over 3 $I_{sat}$ (where $I_{sat}$=3.6 mW/$cm^2$ for the $^{87}$Rb D2 transition) per cooling beam. This is achievable owing to the low absorption and the high-power handling capability of the Si3N4 waveguides. The power loss from the fiber input to the sum of the free-space emitted beams can be around 15.8 dB in various embodiments. This power loss can include the loss from the packaged fiber input, excess loss of a 1×3 splitter, waveguide, mode transformer, and/or grating losses.

In many embodiments, a PICMOT can be designed to support wavelengths from 405 nm-2350 nm. A PICMOT can be integrated with other key active and passive components including lasers, ultra-low power consumption modulators, and/or reference cavities, to further reduce the size of 3D-MOTs. In some embodiments, The PICMOT system can be designed for operation at different wavelengths for different atom species. Different atom species can include (but is not limited to) neutral strontium (atomic clock transitions in the range from 461 nm-813 nm) and/or cesium (MOTs at 852 nm). In several embodiments, PICMOTs can support ultra-compact, energy efficient, and portable cold atom systems.

In accordance with several embodiments of the invention, photonic integrated circuit (PIC) technology in silicon nitride (Si3N4) platforms can offers a rich set of passive and active components with low optical losses and compatibility with CMOS foundry processes at cold atom visible wavelengths. In several embodiments, various materials can be used for the waveguides and/or used in combination such as tantalum pentoxide, alumina oxide, and/or aluminum nitride. Mixtures of components and waveguide material systems can be used also. Active elements made of appropriate materials for the wavelength and function can be integrated with waveguide platforms (e.g., modulators, switches, gain, nonlinear optics, and/or lasers). Active elements can include materials that include semiconductors (e.g., GaAs or GaN), nonlinear optical materials (e.g., lithium niobate), modulator materials (e.g., such as PZT, AlN, lithium niobite), and/or combinations of these. Integration can be hybrid, heterogeneous, and/or monolithic.

In various embodiments, PICs can emit collimated free-space beams with a large cross-sectional area (e.g., cross-sectional area of 8.75 $mm^2$). The emission can correspond to a large on-chip optical mode expansion factor of around $20\times10^6$ from the 0.44 $\mu m^2$ area waveguided mode to the free-space beam delivered to 3D-MOT. In various embodiments the expansion factor and/or area waveguided mode can be different amounts.

Figure 3B:
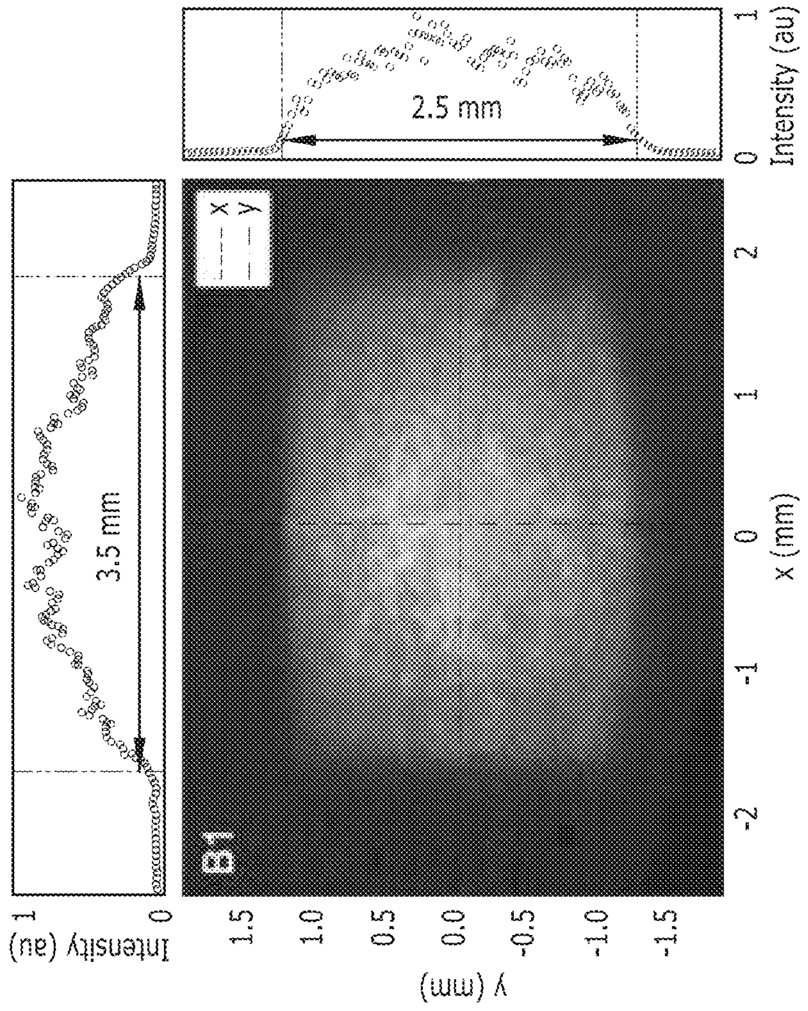
FIGS. 3A through 3B conceptually illustrate an Image depicting photonic integrated circuit (PIC) beams incident on a plane parallel to the PIC surface at a height of 5 mm.
Figure 3A:
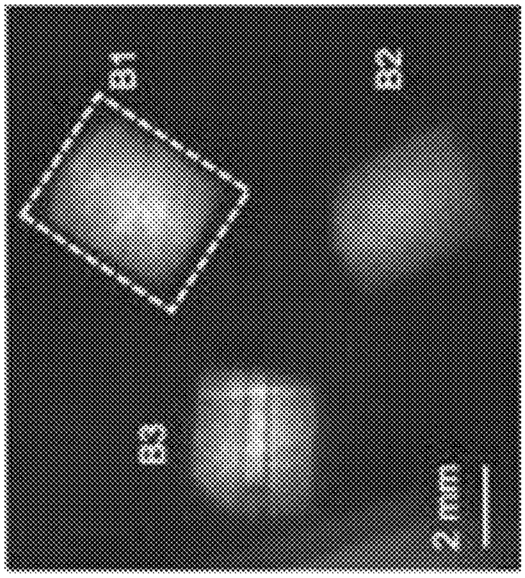

An example Image depicting photonic integrated circuit (PIC) beams incident on a plane parallel to the PIC surface at a height of 5 mm is shown in FIG. 3A through 3B. These cross-sections can correspond to the dashed rectangle 210 from FIG. 2. FIG. 3A depicts cross-sections of three beams B1, B2, and B3. FIG. 3B depicts the cross section of beam B1. Perpendicular cross-section image of beam B1 and the profiles of the beam intensity for two axes of the beam emitter and the corresponding $1/e^2$ beam widths are shown.

A CMOS camera can be used to image the beams incident on a screen located above the PIC surface (e.g., as shown in FIGS. 3A and 3B). In accordance with several embodiments of the invention, the measured beam width (defined as the $1/e^2$ diameter) dimensions can be determined based on the beam intensity cross section at a distance (e.g., 5 mm) away from the PIC emitter. In several embodiments this beam width can be around 2.5 mm by 3.5 mm (as depicted in FIG. 3B). The beam intensity cross section can, in various embodiments, corresponds to a trapping beam overlap volume of around 22 $mm^3$.

Measurements of the beam widths at different distances above the PIC surface can be used to determine divergence angles. In many embodiments, divergence angles can be of around 0.16° and 0.35° for the x and y axes, respectively. This can correspond to $M^2$ values of 10 and 15 in the x and y axes, respectively, characteristic of flat-top beams. It has been shown that trapping beams of a more uniform, flat-top intensity can achieve higher MOT atom numbers than gaussian beams due to the increased optical forces near the edges of the beam overlap volume.

In several embodiments root-mean-squared (RMS) intensity variations can be around <9% in the central 20% of the mode area and/or around 12% in the central 80% of the mode area. In some embodiments, the effective Rayleigh lengths ($Z_R/M^2$) can be around 125 cm and around 113 cm respectively. In various embodiments, the beam dimension aspect ratio can change by around 20% over 35 cm. In various embodiments, the good collimation (e.g., as described above) can enable placing the grating emitters further apart on the PIC layout to achieve a larger beam intersection height. This is important for allowing space in which to position the MOT. In several embodiments, a large beam size (e.g., as described above) can be possible due to the combination of the large width and low loss of the slab expander and the shallow etch of the grating emitter. Further details on the grating emitter are described elsewhere herein.

The average power loss from the fiber input to each free-space beam output can be around 21.4 dB, in several embodiments. The average power loss can correspond to a total optical loss of beam delivery (fiber input to the sum of the beams) of around 15.8 dB. These losses can include the fiber to waveguide, splitter, and/or waveguide propagation losses. In some embodiments, the beams (labeled B1, B2, B3) can have a relative power of 28%, 28%, 44% of the input power, producing no noticeable change in PICMOT operation. In several embodiments, the relative power of the beams can be other values. As an example, for an input fiber power 80 mW, the PIC can deliver an average power of 0.58 mW per cooling beam, corresponding to a beam intensity of 6.6 $mW/cm^2$, or 1.8 $I_{sat}$ (for $I_{sat}$=3.6 $mW/cm^2$). A summary of the loss contributions from the PIC is provided in further detail elsewhere herein.

Figure 4:
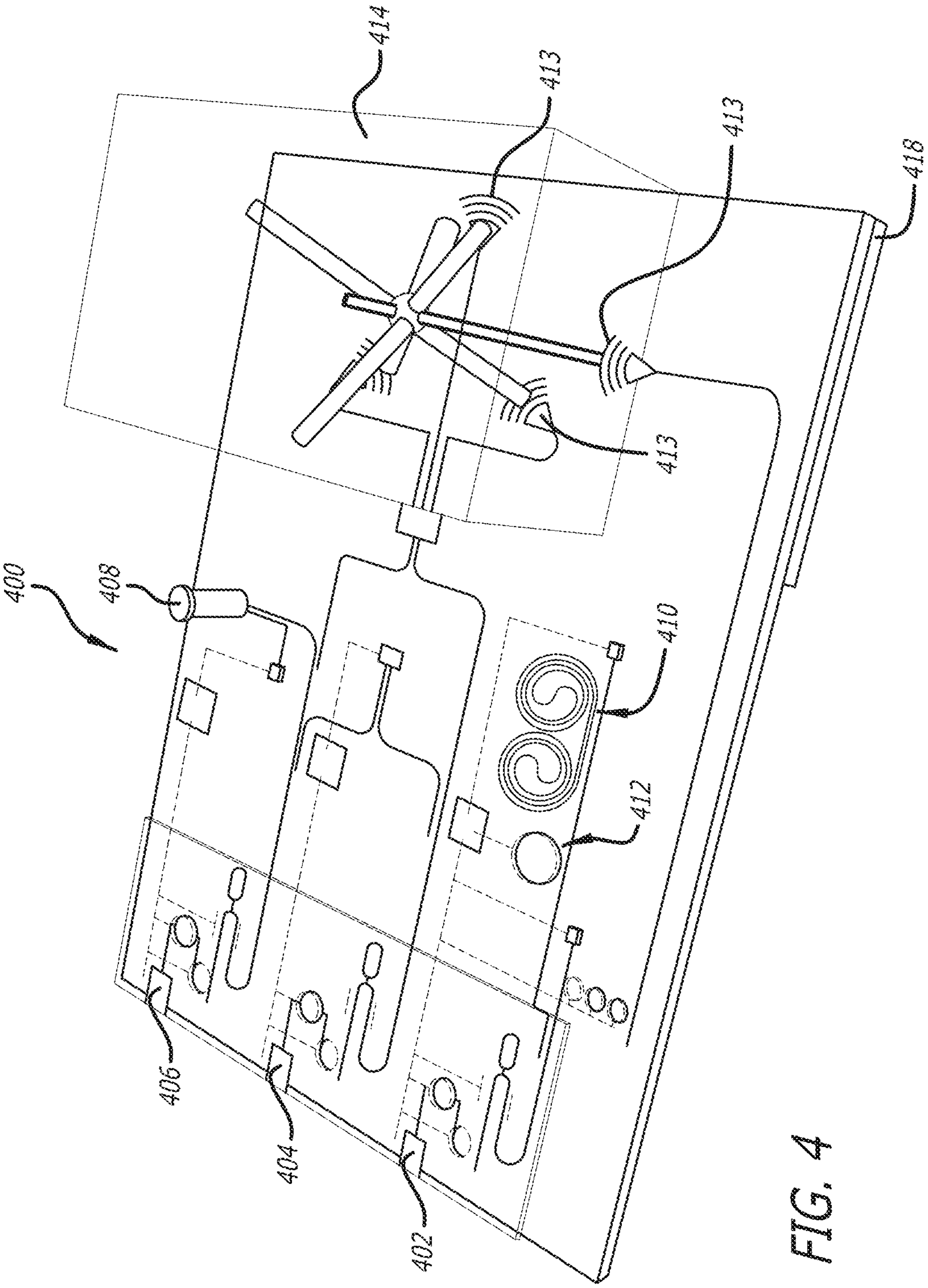
FIG. 4 conceptually illustrates an example integrated atomic-photonic system with free-space beam delivery to a 3D-MOT.

An example integrated atomic-photonic system with free-space beam delivery to a 3D-MOT is conceptually illustrated in FIG. 4. The example shows how large-area PIC grating emitters can be used in an integrated atomic-photonic system for cold atom trapping and/or probing. In various embodiments, heterogeneously integrated external cavity $Si_3N_4$ lasers can be used to generate light for atom cooling, repumping, and/or probing. An integrated atomic-photonic system 400 can include a probe laser 402 (the probe laser can be an optional component), a cooling laser 404 and/or a repump laser 406. The cooling laser 404 and the repump laser can coupled to a spectroscopy reference 408. The probe laser 402 can be locked to a reference cavity coil resonator 410 (optional) for frequency noise reduction. PZT-actuated modulators 412 (optional) and shutters can be utilized for locking and/or probe light control. Each laser beam-line can be delivered to the atomic species using grating emitters 413 described elsewhere herein. The vacuum (e.g., atomic) cell 414 containing the atoms can be positioned above the PIC. A magnetic field generation region 418 can be arranged around the vacuum cell 414. In several embodiments, locking of a pre-stabilized laser to an atomic transition can include frequency shifting, optical nonlinearities, laser tuning and/or modulation.

PICMOTs, in accordance with several embodiments of the invention can generate MOT clouds with temperatures around 185±17 μK and 221±36 μk in the y and z axes.

The laser cooling and trapping of $^{87}Rb$ atoms using a fiber-coupled silicon nitride photonic integrated circuit (PIC) that is directly interfaced to a 3D-MOT can be performed in accordance with various embodiments of the invention. In several embodiments, a fiber-coupled silicon nitride photonic integrated circuit that is directly interfaced to a 3D-MOT can deliver both cooling and repump light to a rubidium vacuum cell. In various embodiments, a laser beam delivery PIC can achieve a waveguide free space beam expansion factor of around $20\times10^6$ for an operational 3D-MOT. In many embodiments, three output beams can be used, each having a large area of 2.5 mm×3.5 mm. The beams can be emitted at an angle of 57° to the PIC normal and intersect nearly orthogonally at a point 9.45 mm above the PIC surface.

In several embodiments, cooling and trapping of greater than 5 million $^{87}Rb$ atoms and a cloud temperature near 200 μK can be achieved. Six laser cooling and repump beams can be produced solely by the PIC and retroreflector mirrors in accordance with many embodiments of the invention. This arrangement can eliminate the need for bulk optics for beam collimation, splitting, and shaping. In several embodiments, a power balance between the PIC beams does not noticeably drift during the operation and using a polarization-maintaining packaged fiber can reduce polarization-related power drift. For precise and active beam power balancing, thermal tuner $Si_3N_4$ phase shifters or ultra-low-power stress-optic piezo tuners can be utilized.

In several embodiments, a single connectorized fiber input into the PIC can make the system amenable to combining multiple laser sources for beam delivery and can scale to more sophisticated applications that require several beams for trapping, repumping, probing, and narrow-line cooling. In various embodiments combination of multiple laser sources for beam delivery can be applied to Sr neutral atom clocks.

In various embodiments, PIC losses can be lowered by optimizing the performance of the individual components including the input fiber-to-waveguide taper, three-way splitter, slab mode expander, and shallow-etch grating. In various embodiments, total beam delivery loss can be reduced to below 8 dB. This level of performance can eliminate the need for optical amplifiers. In various embodiments, total cooling beam intensity delivered to the atoms can reach the $I_{sat}$ for $^{87}$Rb for an input fiber-coupled power of 2 mW which can be produced directly with a commercial single-frequency diode laser.

In accordance with several embodiments, a PICMOT system can have a modular and robust design that can be used for a variety of cold atom experiments. For example, the large beam intersection height can allow for the PIC to be held ex vacuo. Beneficially, this can enable using this beam delivery approach with different vacuum cells and eliminating any breaking of vacuum to swap the PIC. In several embodiments, due to the large silicon nitride transparency window of 405 nm-2350 nm, the PIC can be used with other visible wavelengths by changing the waveguide width in the lithography mask opening. PICMOTs, in several embodiments can be used for cooling various atomic species and transitions such as cesium and strontium atoms.

In accordance with a number of embodiments, a grating design can be capable of vertically probing the trapped atom cloud for spectroscopy, atom interferometry, and/or an optical atomic clock. In several embodiments generating multiple free-space beams from a single PIC can provide an inherent stability of the optical paths. This stability can improve vibration tolerance in trapped-ion quantum computing. In several embodiments, these advantages can beneficially support a compact cold atom interferometer sensor (e.g., such as for field-deployed gravity mapping measurements). In accordance with various embodiments of the invention, a PIC can deliver the MOT and/or Raman probe beams. In several embodiments, Improved uniformity of Raman beam spatial profiles can improve the resulting interferometer sensitivity.

Previously, compact, microfabricated 3D-MOTs can be constrained by the scaling of the trapping beam overlap volume. The peak number of trapped atoms for different beam overlap volumes scales as $N \propto V^2$ for a pyramid MOT and $N \propto V^{1.2}$ for a GMOT. Ultimately, in many cases, with uncorrelated particles the sensitivity of any cold atom experiment, such as atom interferometry, is limited by the quantum projection noise. With a typical requirement of over 1 million atoms (corresponding to a phase resolution of a milliradian), the comparable GMOT configuration scaling implies that a minimum overlap volume of 45 mm$^3$ is necessary.

In accordance with many embodiments of the invention, a PIC-based 3D-MOT (PICMOT) can have an estimated beam overlap volume of around 22 mm$^3$. This overlap volume can be around 9 times smaller than the volume used for an equivalent atom number GMOT which can, in some cases, require an input free-space beam of diameter 20 mm. In many embodiments, using slab expanders, can allow output beam widths over 6 mm. Using beam widths over 6 mm, several embodiments can achieve traps of over $10^7$ atoms.

In several embodiments an operational $^{87}$Rb 3D-MOT can be based on the interface described in FIG. 4. Laser cooling light can be at 780.24 nm. In various embodiments, the laser cooling light can be prepared by stabilizing the cooling laser relative to a hyperfine transition on the $^{87}$Rb D2 line using an external saturation absorption spectroscopy setup. In accordance with many embodiments of the invention, a repumping laser can be aligned to the $F=1 \rightarrow F'=2$ transition, as described with greater detail elsewhere herein). The cooling laser detuning A can be controlled with an acousto-optical frequency shifter (AOFS). In various embodiments, the axial magnetic field gradient can be around 20 G/cm through the trap center.

Figure 5B:
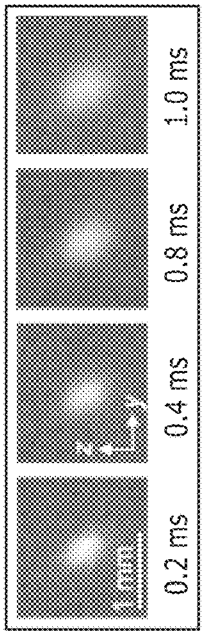
FIGS. 5A through 5C conceptually illustrate an example Rubidium 3D-MOT demonstration.
Figure 5C:
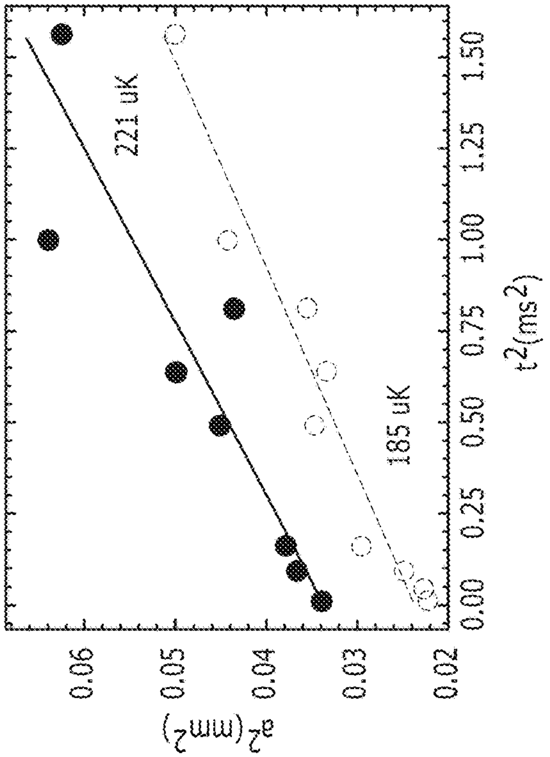
Figure 5A:
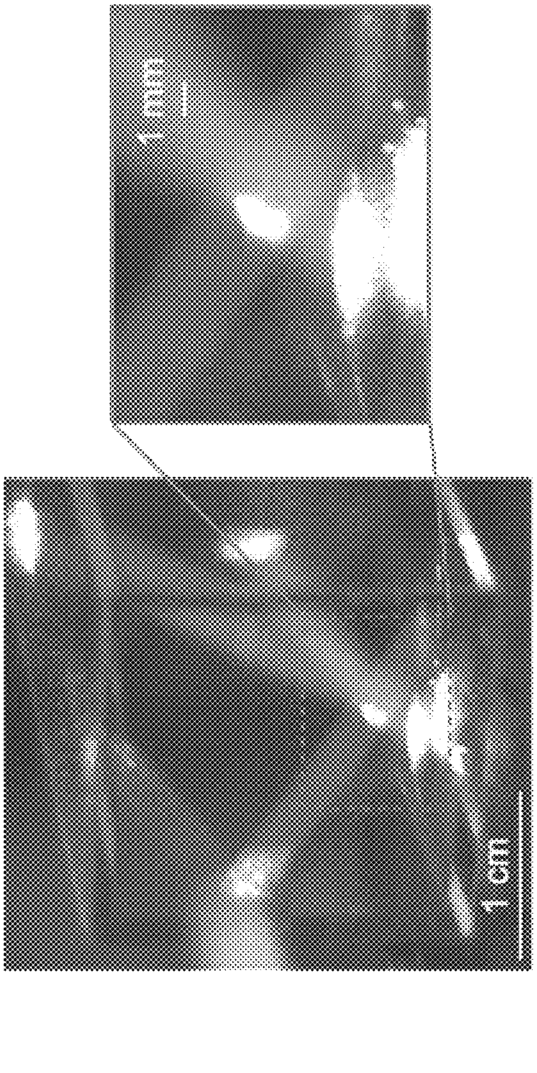

An example Rubidium 3D-MOT demonstration is conceptually illustrated in FIG. 5A through FIG. 5C. In the depicted example, the side length of the glass cell can be around 20 mm. The trapping beams fluoresce as they propagate through the cell containing the atomic vapor. The inset of FIG. 5A is a zoom-in of the MOT cloud (note some camera pixels are saturated). FIG. 5B depicts averaged absorption images of the MOT cloud after free-expansion over time. FIG. 5C is a chart showing squared cloud radius in the z (blue) and y (red) dimensions for squared time of flight (TOF) times $t^2$. The shown linear fits are for $$\sigma^2 = \sigma_0^2 + \frac{k_B T}{m} t^2,$$

where σ is the Gaussian width (radius) of the cloud along an axis, $k_B$ is the Boltzmann constant, m is the mass of a single $^{87}$Rb atom, and T is the temperature of the MOT cloud.

A cloud of trapped $^{87}$Rb atoms, as generated by an $^{87}$Rb 3D-MOT (e.g., similar to the PICMOTs as described with respect to FIG. 2 and/or FIG. 4.) are shown in FIG. 5A. The beams emitted from the PIC fluoresce as they propagate through the vacuum cell. The inset in FIG. 5A shows a close-up image of the MOT cloud. In various embodiments, a generated MOT cloud can have a cloud gaussian diameter of around 0.4 mm. The steady-state population of the MOT can be around $\sim 1\times10^6$. The steady-state population of the MOT can, in some embodiments, be measured by collecting the cloud fluorescence onto a photodiode. In many embodiments, a photodiode and feedback control circuit can be used for locking at least one laser to a frequency reference. In various embodiments, a PICMOT with an input power of around 150 mW into the PIC fiber input can achieve an atom number of $\sim 1\times10^6$ with the cooling laser red-detuned by 12.6 MHz. The exponential time constant for the MOT loading can be determined to be around 0.3 s in accordance with some embodiments.

The temperature of a trapped atom cloud can be evaluated using an absorption imaging time-of-flight (TOF) technique. An alternate release-and-recapture (RR) method can also be used. In various embodiments, the cooling and repump beams are turned off in <5 μs (as further described elsewhere herein). When the cooling and repump beams are off, the temperature can then be extracted based on the free-expansion of the cloud and assuming a Maxwell-Boltzmann velocity distribution of the atoms. For TOF, a free-space beam resonant with the $^{87}$Rb cooling transition can be externally routed to probe the MOT and the shut-off of the optical and magnetic fields can be synchronized. Then, in accordance with embodiments of the invention, cloud widths can be extracted from pairs of absorption images $I_1$ and $I_2$, where $I_1$ is the image of the probe flashed (duration 0.5 ms) at a time $t_{TOF}$ after the MOT shut-off and $I_2$ is recorded at $t_{TOF}$+70 ms when the MOT has dissipated. An optical depth (OD) can be extracted using the equation $OD=-\ln(I_1/I_2)$ and a Gaussian fit along each axis can be taken to extract the width of the cloud. By measuring flight times $t_{TOF}$, temperatures can be extracted. In sever embodiments, a temperature of 185±17 μk and 221±36 μk in the y and z axes, respectively, can be achieved. In accordance with some embodiments of the invention, the RR method can result in a conservative temperature determination of around 400±200 μK which serves as an upper bound of the cloud temperature due to an overestimate in defining the boundary of where the atoms can be recaptured. The measured temperature is close to the $^{87}$Rb D2 line Doppler cooling limit of 146 μK and the different temperature for each axis in each axis can be due to the imbalance of forces in the MOT and/or different magnetic field shimming conditions. In various embodiments, sub-Doppler-limit MOT temperatures can be achieved with additional cooling stages such as polarization-gradient cooling.

In accordance with many embodiments of the invention, a beam delivery PIC can be bonded to an aluminum plate and fiber packaged. Conventional zero-order quartz quarter waveplates can be placed in a plastic holder layer directly above the PIC and rotated to achieve the required handedness and ellipticity of polarization. The PIC setup can in several embodiment, be mounted on a multi-axis stage and aligned with respect to a pair of anti-Helmholtz coils. A vacuum vapour cell containing a rubidium dispenser (e.g., the ColdQuanta™ rubidium miniMOT) can be brought into the setup and mounted directly above the PIC. Two separate lasers can be used for the cooling. In some embodiments, the cooling laser can be a Distributed Bragg Reflector (DBR) 780 nm laser (e.g., a DBR 780 nm laser from Photodigm™). The repump in many embodiments, can be derived from frequency-doubling a 1560 nm external cavity diode laser. In several embodiments, the cooling laser can be locked to the $^{87}$Rb $5S_{1/2}$, F=2→F'=(1,3) cross-over transition. An acousto-optical frequency shifter (AOFS) can be used to shift the cooling beam to a red detuning of 10-20 MHz relative to the F=2→F'=3 hyperfine transition. In several embodiments, both beams can be combined with a fiber-based coupler. The beams can be amplified using a booster optical amplifier (BOA, e.g., Thorlabs BOA785S). BOA can be used for PIC input powers up to 80 mW. In accordance with embodiments of the invention, the BOA can be used for MOT operation during time of flight (TOF) measurements. The BOA can be able to shutter the optical output with a switch-off time of less than 5 μs. For atom number and loading rate measurements, a fiber-coupled tapered amplifier providing an output power of up to 150 mW (e.g., a fiber-coupled tapered amplifier from Newport™) can be used in several embodiments. The fluorescence of the MOT cloud can be focused onto a photodetector. In various embodiments, the MOT temperature can be measured with absorption imaging by using a separate free-space probe beam that is near-resonant with the F=2→F'=3 generated using another AOFS. During the TOF expansion and imaging, a PICMOT magnetic field and the cooling and repumping light can be turned off in accordance with various embodiments of the invention. In various embodiment, the frequency shifting function can be incorporated directly on the integrated PIC beamline. In various embodiments, sideband modulation can be incorporated directly into the PIC beamline. Integrated technologies to realize these functions in these embodiments, include but are not limited to stress-optic modulation and electrooptic modulation and acousto-optic modulation.

Figure 6:
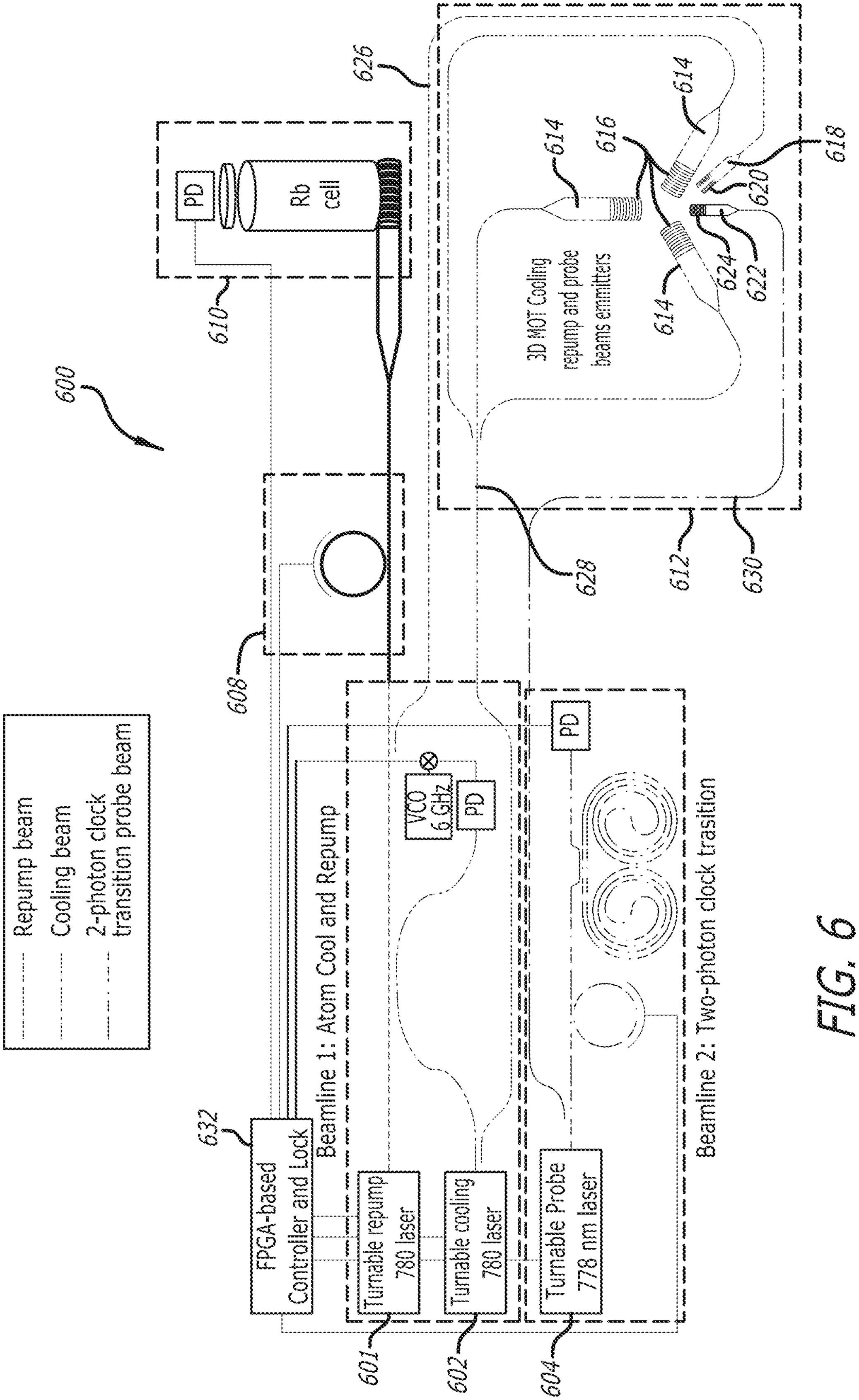
FIG. 6 conceptually illustrates an example photonic integrated circuit for use in an atomic clock.

Two integrated beamlines can be used, in various embodiments, with a $^{87}$Rb two-photon atomic clock. An example photonic integrated circuit for use in an atomic clock is conceptually illustrated in FIG. 6. In accordance with various embodiments of the invention, integrated atomic beamline systems can include ultra-low loss waveguides, stress-optic (PZT) controlled modulators, optical laser cooling beam interfaces, ultra-low linewidth lasers, and optical reference cavities and laser stabilization. A PICMOT 600 can include an integrated tunable repump 601, cooling laser 602 and/or probe laser 604. The probe laser 604 and associated down beamline components can all be optional. The cooling laser 602 can be locked to the tunable probe laser 604 via a beat note module. An integrated coil resonator can be used to reduce the probe laser 604 beam linewidth. The PICMOT 600 can further include an integrated piezo-electric (PZT) ring sideband modulator 608. The PZT ring sideband modulator 808 can be used for laser locking to an atomic reference module 810. The atomic reference module 610 can be a saturation spectroscopy module to lock a repump laser 601 to a rubidium line. The PICMOT 600 can further include a beam delivery module 612. The beam delivery module 612 can include three cooling beam mode expanders 614 and three cooling beam grating emitters 616 for each beam. The beam delivery module 612 can further include a repump beam mode expander 618 and repump beam grating emitter 620. A probe beam mode expander 622 and probe beam grating emitter 624 can also be included in the beam delivery module 612. The repump beam and laser can correspond to a first beamline 626. The cooling beam and laser can correspond to a second beamline 628. The probe beam can laser can correspond to a third beamline 630. All locking and processing can be handled by a controller 632.

In accordance with many embodiments of the invention, multiple families of beamlines can be used that are suitable to address multiple applications and atomic species. Portions of beamlines can be integrated.

In many embodiments, a beamline (e.g., first beamline 626) can be a repump laser beamline. Beat-note lock modules can create an offset from a tunable repump laser at a desired frequency. The desired frequency can be selected for use with the atomic species (e.g., rubidium) in accordance with embodiments of the invention. The desired frequency can be a 7 GHz transition to repump the rubidium atoms after they decay to the ground state. In accordance with several embodiments of the invention, a first beamline (e.g., Beamline 1 in FIG. 2) can be an atom cool and repump beamline. An atom cool and repump beamline can include a tunable repump laser and a tunable cooling laser. In some embodiments, the tunable repump laser can be a 780 nm laser. In many embodiments, the tunable cooling laser can be a 780 nm laser.

In several embodiments, a beamline (e.g., a third beamline 630) can be a probe laser beamline. Beamlines can include a narrow linewidth coil stabilized 778 nm clock transition (probe) laser. The narrow linewidth coil stabilized 778 nm clock transition laser can use PZT modulation technology. In several embodiments, the lasers can be used with a variety of different atomic species, by tuning the frequencies, different atomic species can be supported. In several embodiments, the overall configuration is broadly applicable to a wide range of atomic species by adjusting lasing wavelengths and frequency offsets (e.g. 780 and 776 nm for 85Rb MOT and 852 and 659 nm for 133Cs MOT).

In many embodiments, a beamline (e.g., a second beamline 628) can be a cooling laser beamline. A cooling beamline can include a 780 nm cooling laser modulated by an integrated ring piezoelectric (PZT) modulator. The integrated ring PZT modulator can create a sideband (e.g., see 610 in FIG. 6) at ±1 MHz for locking the repump laser to a rubidium spectroscopy module.

In several embodiments, All locking and processing can be handled a controller (e.g., controller 632). Controllers can be master FPGA field programmable gate array (FPGA) controllers in several embodiments. In some embodiments, a beamline can include a tunable 780 nm cooling laser that is locked 7 GHz away from the repump laser using a beat-note module consisting of the two lasers, a photodetector and a beat-note lock circuit. The beat-note lock circuit can, in several embodiments, have a 7 GHz radio frequency (RF) reference oscillator to keep the cooling and repump lasers at the proper offset frequency. The first beamline can generate the rubidium atom cooling and repump beams that are delivered to a rubidium magneto-optic trap (MOT). The cooling and repump beams can be delivered, in some embodiments, using a waveguide to free space emitter interface.

In various embodiments, a probe beamline can generate a two-photon clock transition beam through the same MOT beam delivery interface. A two-photon clock transition beamline can be a very narrow linewidth laser with low phase noise. The narrow linewidth laser can be generated by a 778 nm tunable laser that is locked to an integrated coil resonator using an integrated PZT modulator in accordance with several embodiments of the invention.

In some embodiments, a beamline can further include atom spectroscopy lock sideband modulators. Atom spectroscopy lock sideband modulators can lock a repump laser to an atomic reference. In various embodiments, there is one phase shifter ring, modulated at 1 MHz. The insertion loss of each phase shifter for an on-chip system can be <1 dB in accordance with many embodiments of the invention. The 1 MHZ sidebands can allow for locking the repump to a saturation absorption spectroscopy cell. Saturation absorption spectroscopy can use a grating emitter to probe a Rb atomic cell to set an absolute reference for the 780 cooling and repump lasers in accordance with various embodiments of the invention.

In many embodiments, beamlines (e.g., cooling beamlines, repump beamlines, 780 nm beam lines) have several components. A 2×2 coupler with a fast PD can be included for monitoring repump/cooling beat-note (e.g., ~7 GHZ) in accordance with many embodiments. Beamlines, in some embodiments, can include coil-resonator stabilizers to reduce the linewidth of lasers (e.g., a probe laser at around 778 nm) for two photon transition probing of the MOT. In several embodiments of the invention, 3D-MOT beam delivery can be achieved using large-area gratings (3 mm by 4 mm) to trap (e.g., magnetically trap) and laser cool Rb atoms.

Figure 7:
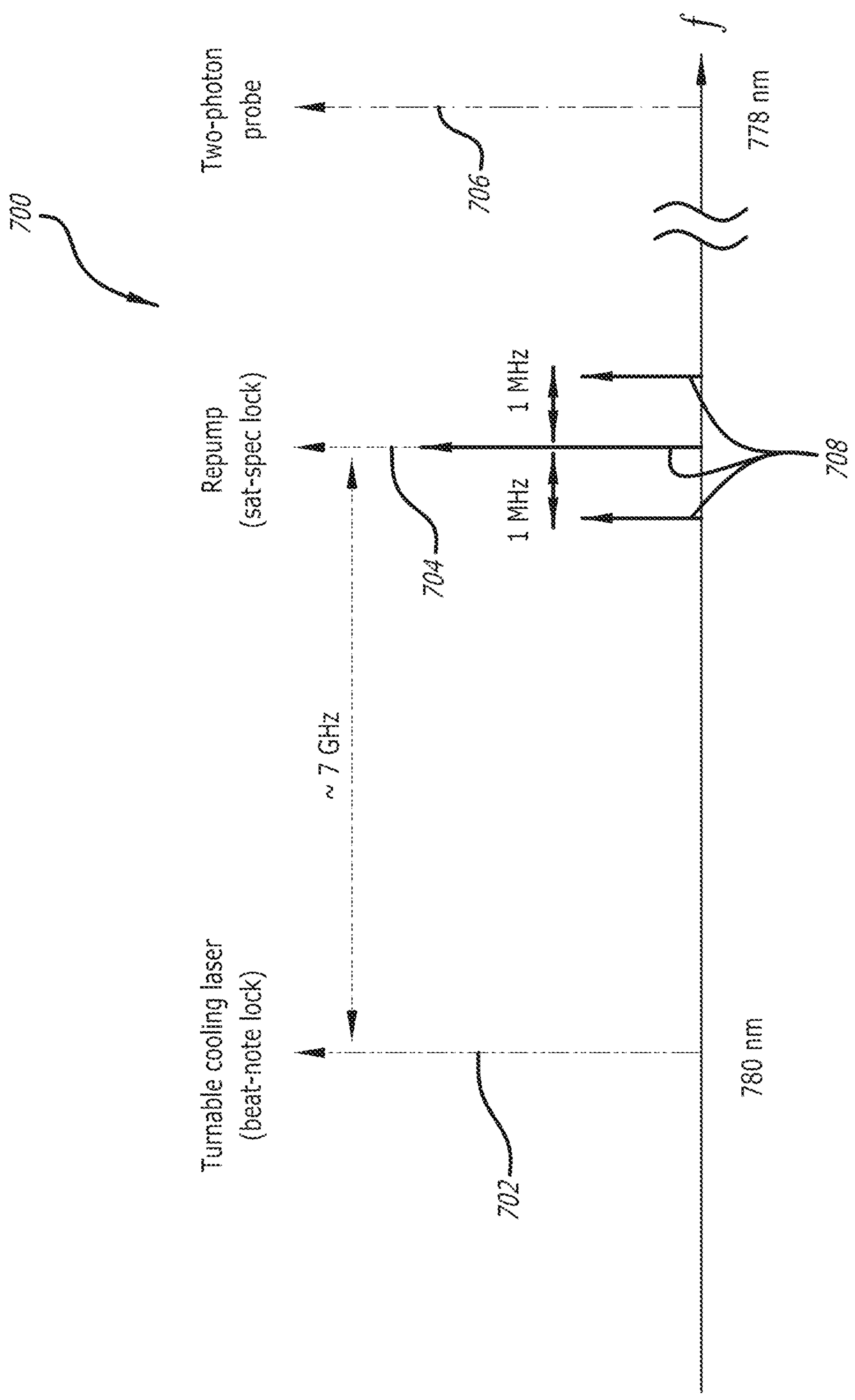
FIG. 7 conceptually illustrates example optical frequencies generated by first and second beamlines.

Example optical frequencies generated by first and second beamlines are conceptually illustrated in FIG. 7. The integrated atomic beamline system 700 can include a first beamline and a second beamline. The first beamline can include a tunable cooling laser 702 and a repump laser 704. The second beamline can include a two-photon probe laser 706. In several embodiments a cooling laser and repump laser can be frequency offset by around 7 GHZ.

Spectroscopy lines 708 can be are modulated onto the repump laser using integrated PZT technology. In several embodiments, integrated PZT technology can lock the repump laser to atomic transitions in a spectroscopy module (e.g., a rubidium spectroscopy module and/or spectroscopy module 610). The spectroscopy lock (e.g., as performed by the spectroscopy module) can set all lasers and laser modulation lines relative to the proper rubidium transition in accordance with embodiments of the invention. In many embodiments, simultaneously tuning the frequency of the cooling laser and/or monitoring the cooling/repump laser beat-note on a fast photodiode can allow for controlling the cooling laser detuning. This can be important since the detuning can, in several embodiments, affect the number of atoms trapped. Further, fast laser tuning control can be used for sub-Doppler cooling to below the $^{87}$Rb MOT Doppler limit of 146 uk, in accordance with embodiments of the invention.

Figure 8A:
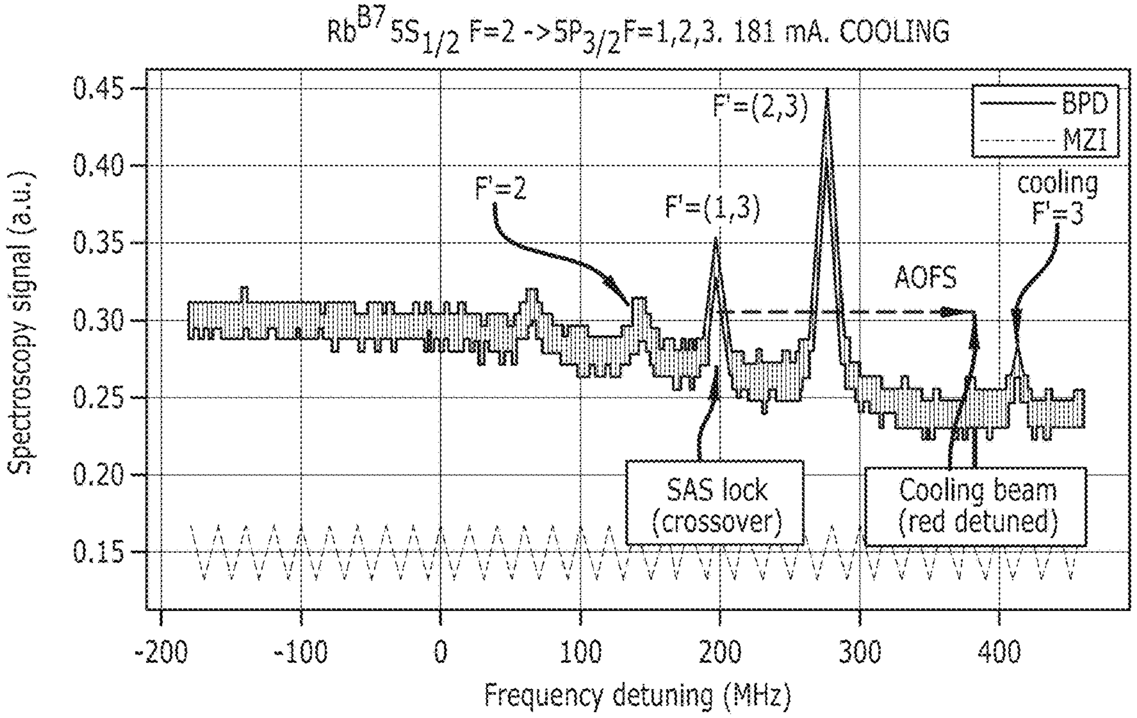
FIGS. 8A through 8B conceptually illustrate an example of data for laser stabilization for a MOT demonstration.

An example of data for laser stabilization for a MOT demonstration is conceptually illustrated in FIG. 8. FIG. 8(A) depicts example data recorded from a frequency sweep of a cooling laser across a $^{87}$Rb $5S_{1/2}F=2\rightarrow 5P_{3/2}F'=1, 2, 3$ transitions. An acousto-optical frequency shifter (AOFS) can be used to shift the laser locked to the F'=(1,3) peak to achieve a red-detuning with respect to the F'=3 cooling transition. In the depicted example, an unbalanced Mach-Zehnder interferometer (MZI) with FSR 20 MHz is used to calibrate the laser frequency sweep while the saturation absorption spectroscopy signal is recorded on a balanced photodetector (BPD).

Figure 8B:
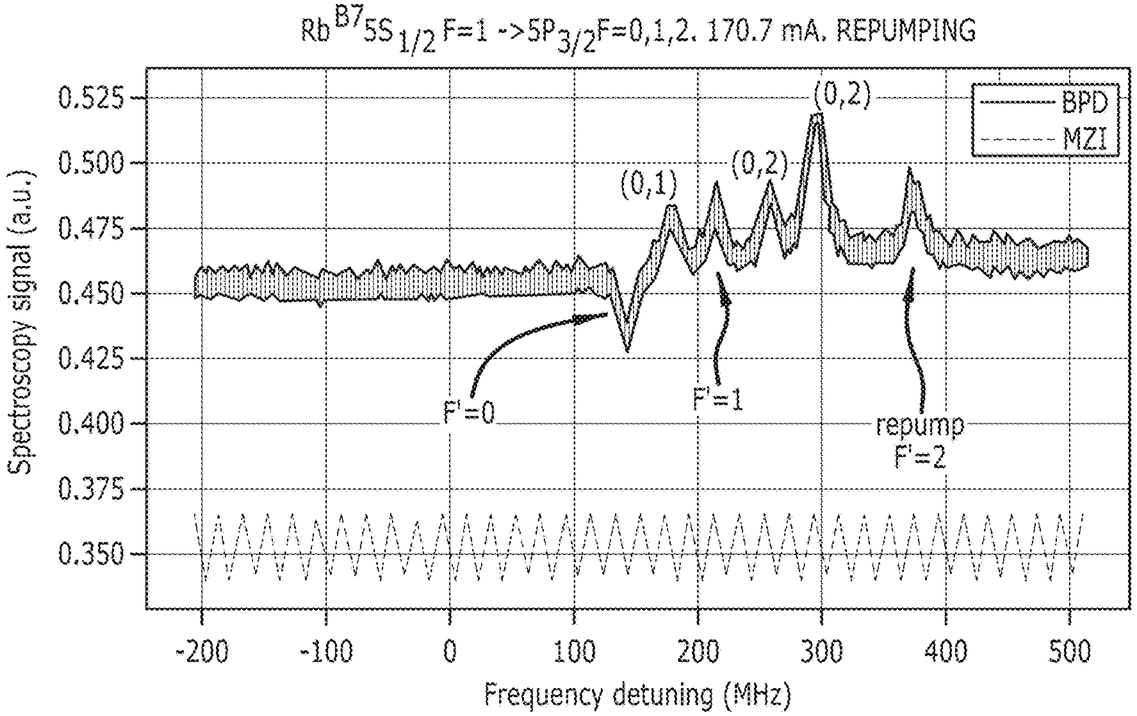

FIG. 8(B) depicts exampled data recorded from a frequency sweep of repump laser across the $^{87}$Rb $5S_{1/2}F=1\rightarrow 5P_{3/2}F'=0, 1, 2$ transitions. In the depicted example, the repump laser is aligned to the F'=2 cooling transition.

In accordance with many embodiments of the invention, a cooling laser can frequency stabilized to a cross-over peak (as indicated in FIG. 8A) and the acousto-optical frequency shifter (AOFS) can be used to control the −200 MHz shift for detuning adjustment. The repump laser can be free-running and/or can be aligned with respect to the repump transition by maximizing the signal of the MOT fluorescence.

Figure 9:
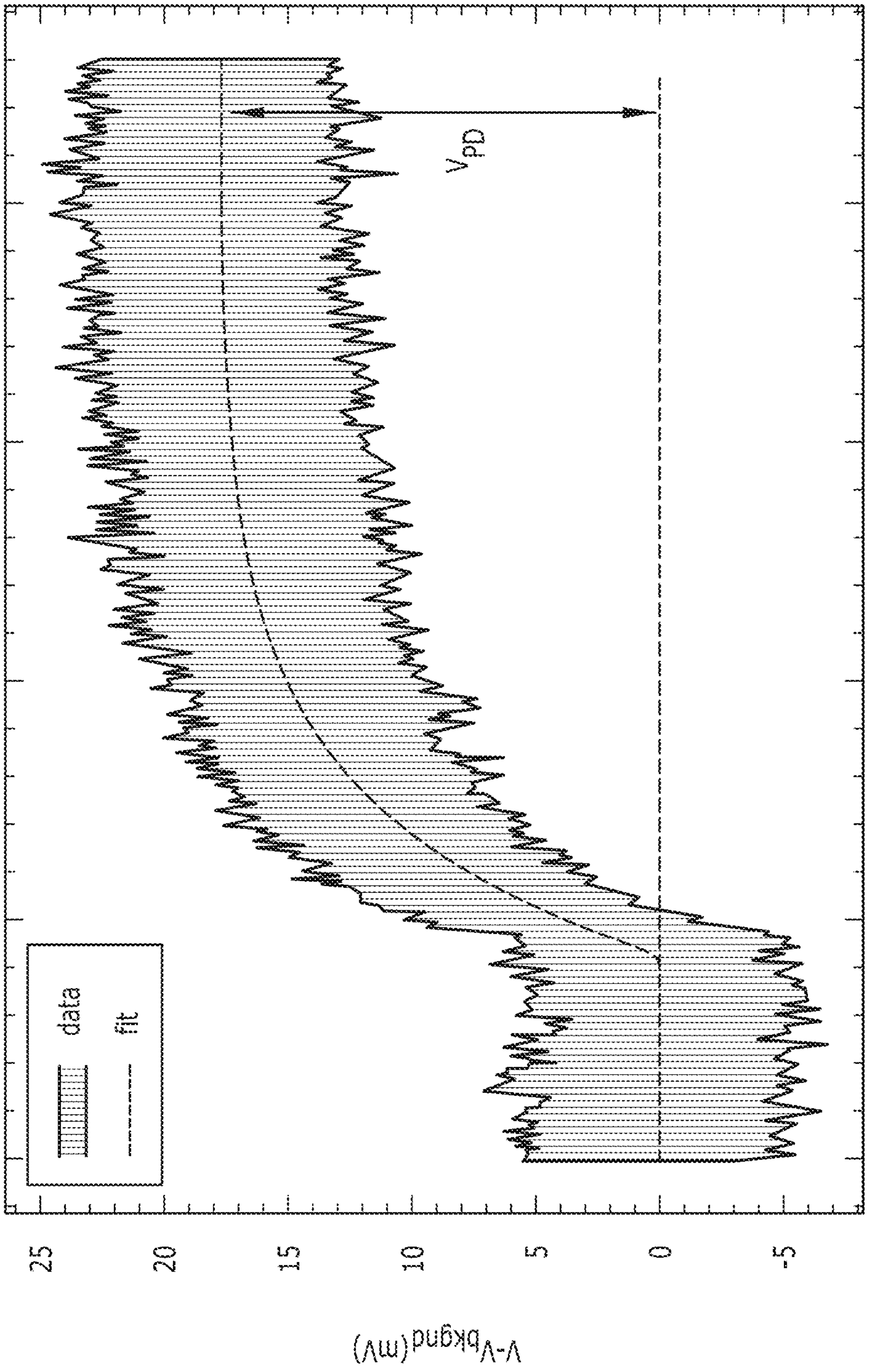
FIG. 9 conceptually illustrates example measurement data for a MOT loading rate achieved by capturing the fluorescence of the atoms onto a photodetector.

Example measurement data for a MOT loading rate achieved by capturing the fluorescence of the atoms onto a photodetector is conceptually illustrated in FIG. 9. FIG. 9 includes a loading rate curve suitable for extracting a steady-state atom number and/or a loading time of a MOT (e.g., a PICMOT). In the depicted example, a magnetic field is turned on at around t=1.25 seconds. The example data is fit to an exponential of the form $N(t)=N_{ss}(1-\exp(-t/\tau))$ where $N_{ss}$ is the steady-state atom number and $\tau$ is the loading time for the atoms in the trap. The loading rate calculated at $\Gamma=1/\tau=3.33\ s^{-1}$ for this example. In several embodiments, MOT loading curve traces can be taken with a photodetector that captures the fluorescence of the MOT cloud.

A comparison of different example integrated MOT beam delivery platforms and their performance is shown in FIG. 10. For techniques that achieve practical atom numbers of over 1 million, a constraint on the size of the cold atom package can be a distance required for the beam expansion optics between the optical fiber input and the trap center. For example, GMOT demonstrations have used an input free-space beam with ~20 mm diameter beam that can be achieved with a commercial fiber collimator and bulk-optic beam expander, taking up a length of over 10 cm. Similarly, while a meta-surface beam expander can be connected above a PIC, the propagation distance of 15 cm to achieve the large beam size similarly limits package volume. Hence the PICMOT described herein provides a small form factor and high performance that has not been achieved with other methods.

Generally, the number of atoms trapped in a MOT depends on the overlap volume of the cooling beams. This is because a larger beam volume in each dimension of the trap is related to the stopping distance available to cool the atoms and therefore the maximum speed of the atoms that can be part of the MOT. The beam overlap volume for a PIC beam delivery approach consistent with many embodiments of the invention can be around 22 mm$^3$. This is around 2 times smaller than the volume used for an equivalent atom number legacy GMOT. Furthermore, legacy GMOTs can often utilize an input free-space beam of diameter of around 20 mm which requires beam expansion and collimation optics. Compared to microfabricated pyramid MOTs which have a comparable beam overlap volume of up to 20 $mm^3$, PICMOTs, in accordance with embodiments of the invention achieve an atom number that is over 700 times higher.

In several embodiments, PICMOT systems can provide high levels of system integration, reduced optical losses, and compact magnetic field generation. In various embodiments, PIC fabrication processes can use photolithography masks which can be flexibly configured. Chip component layouts can include free space beam emitters of varying dimensions and beam emission angles. Thermal and/or stress-optic tuners and/or phase can be incorporated to control beam parameters to maximize MOT atom numbers in various embodiments. The thermal and/or stress optic tuners can in several embodiments, be compatible with on-line multi-parameter optimization algorithms. CMOS foundry compatible fabrication processes of several embodiments lends itself to hybrid integration of beam delivery with on-chip laser and detector technology.

In numerous embodiments, further integration with narrow linewidth lasers can enable compact MOTs in which all the laser delivery, interrogation and probing can be combined on a PIC. In several embodiments, PICMOTs can include laser sources, reference cavities for laser stabilization, modulators, and/or free-space beam outputs, co-located on a single PIC. It can be particularly beneficial to mount all the free-space beam outputs on a single PIC to make alignment consistent. In various embodiments, lasers used for MOT cooling, repumping, and probing can be stabilized and/or controlled on a single PIC, forming PIC-based "beam-lines." PIC-based beamlines can tailored to different frequency stability and/or control requirements. For example, by combining on-chip modulation and filtering, the probe beam can be shuttered to miniaturize the MOT cloud temperature measurement. This higher level of integration can facilitate the transition of atomic systems out of conventional laboratories to field-deployable systems as well as lower the cost of cold atom experiments, and improve the reliability and performance of these experiments.

PIC Design and Modeling

Figure 11:
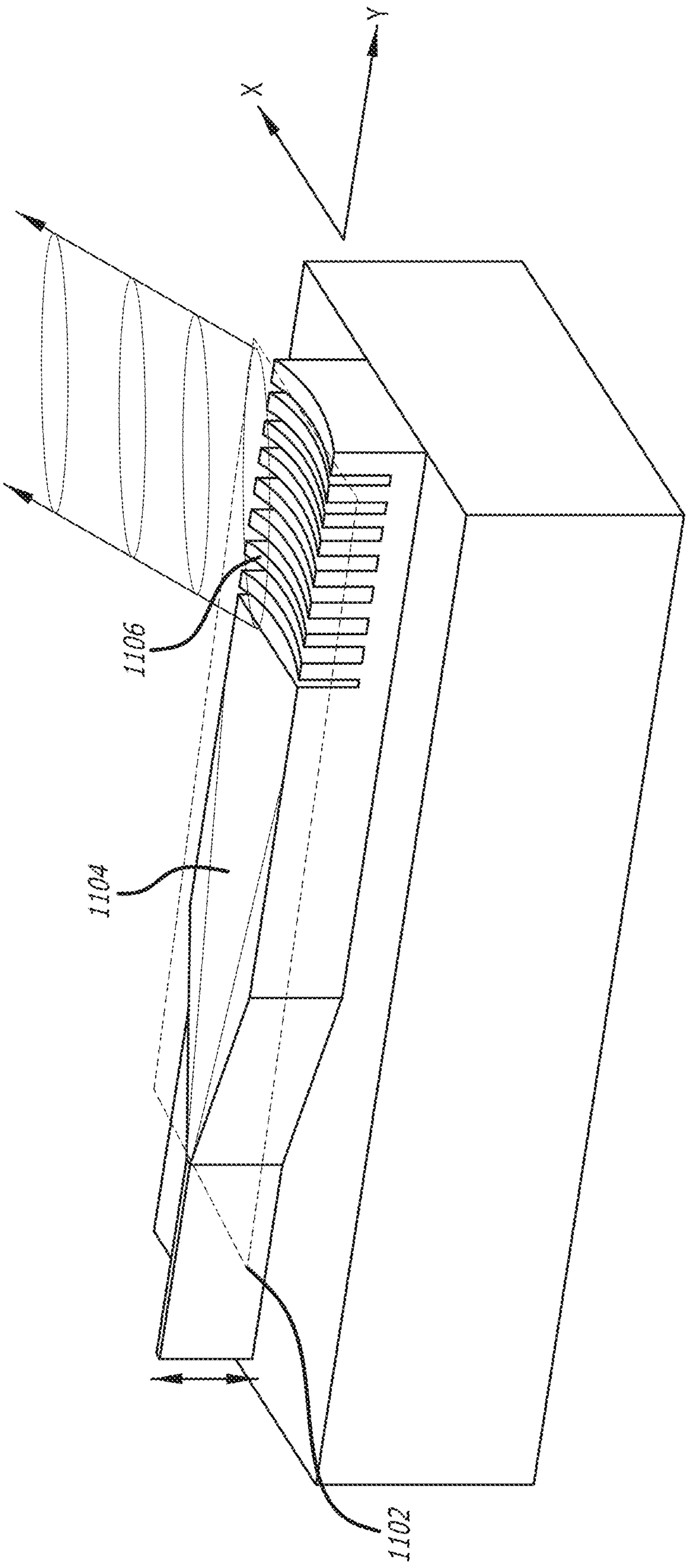
FIG. 11 conceptually illustrates an example mode expander with grating emitter.

An example mode expander with grating emitter is conceptually illustrated in FIG. 11. The waveguide core 1102 can transition to a mode expander 1104. Mode expanders can be long 2D mode expanders. The mode expander 1104 can terminate in a grating 1106. Waveguide cores can be $Si_3N_4$ slab waveguide cores. In many embodiments, gratings can have an around 10 nm partial etch depth. The etch depth can be designed to provide a 54.7° diffraction angle and high power in the desired diffraction order. In several embodiments the length of the etched area can be around 5.25 mm. In various embodiments, the combination of the shallow, controllable grating etch in the relatively thick 120 nm core can enable large beam size in the other axis. In various embodiments, a large beam size can be achieved due to the large beam expansion in the x and y axes due to the design and performance of the slab expander and the grating emitter, respectively. The slab expander must, in numerous embodiments, be sufficiently wide such that the optical mode does not interact with the slab sidewalls and long enough to expand the mode to reach the target beam width. The large size of this photonic structure is made possible by the low optical losses in $Si_3N_4$ platforms and in accordance to several embodiments of the invention. This design can be scaled to larger beam expansion.

In several embodiments, a single mode waveguide (e.g., a 780 nm) design can be a 400 nm wide, 120 nm thick ICP-PECVD $Si_3N_4$ waveguide core with a 15 μm thick thermal oxide lower cladding layer and 3 um thick PECVD oxide upper cladding. In several embodiments, a 1×3 multi-mode-interference (MMI) device can split guided light (e.g., 780 nm) into three single mode waveguides each coupled to a long 2D mode expander that increases the guided mode lateral dimension to 4 mm. Each 2D mode expander, in various embodiments, is terminated into an ultra-large area grating emitter of dimensions 4 mm×5 mm to create the cooling beams. A 120 nm thick $Si_3N_4$ core slab design is used in several embodiments to match the single mode waveguide design, maintain low losses, and realize a compact mode expander.

The grating can be designed with a lens-like phase curvature profile to produce uniform beam intensity in several embodiments. In many embodiments, the grating coupling strength can be lowest at the grating input and progressively increase as the light propagates in the grating region. The grating period and duty cycle in numerous embodiments can be designed to range from 1.18 um to 1.08 um and 10% to 50% from front to end of the grating respectively.

Waveguides can be designed to support a single TEO mode, have low loss, have bend radius<500 um and/or provide a short slab expander length while maintaining low losses. To achieve the required beam sizes for the MOT, a waveguide-to-slab mode transition can be used. The slab expander can be a wide slab of Si3N4 which allows the mode to expand freely inside it. Different waveguide core thicknesses can result in different length of beam expander due to different effective refractive index of mode. For lower losses a thinner core is preferred but that can also result in larger bend radii and longer slab expander. A thinner core can result in very long tapers which are impractical, whereas a thicker core helps in making the beam expander more compact due to higher index contrast. In addition, the bend radius is also considered as thinner cores have larger minimum bend radii resulting in larger devices. For this discussion the minimum bend radius is the radius below which the loss contribution from the bend exceeds 0.0 dB/m.

In several embodiments, a 20 nm core is chosen as it provides a compact slab expander and a bend (e.g., a critical bend radius<500 um) that makes it possible to fit a single grating in one reticle while also having low 0.3 dB/cm loss.

Laser cooling beams for PICMOTs in accordance with embodiments of the invention can be formed using three large-area, chip-to-free-space grating couplers. These couplers can be formed in a material system composed of a silicon nitride device layer and two silicon dioxide cladding layers. Historically, grating couplers have been used in integrated photonics for a relatively small subset of tasks, the most well-known of which is likely the coupling of light between chip-scale waveguides and optic fibers. Grating couplers are ideal for interfacing between planar devices and their surrounding environment. Due to the careful control over the grating's k-vector, the angle at which light is either emitted or transmitted can be targeted with a high degree of precision. When light propagating within a chip diffracts from a grating written into its path, the angle at which the light diffracts relative to the chip's surface normal can be calculated analytically. If we assume that the light is initially propagating within the x-y plane, and that the z-axis represents the direction normal to the chip's surface, then the diffraction angle is given as:

$$\theta = \tan^{-1}\left(\frac{\sqrt{k_{xo}^2 + k_{yo}^2}}{k_{zo}}\right)$$

$$\text{where } k_{xo} = k_x - K_x$$

$$k_{yo} = k_y - K_y$$

$$k_{zo} = k_z - K_z,$$

$$\text{and } k_{zo} = \sqrt{\left(\frac{2\pi}{\lambda}\right)^2 - k_{xo}^2 - k_{yo}^2}$$

In these expressions, $k_x$ and $k_y$ are the x- and y-components of the initial k-vector of the light, and $K_x$ and $K_y$ are the x- and y-components of the grating's k-vector, respectively. Additionally, $k_{xo}$, $k_{yo}$, and $k_{zo}$ represent the three components of the diffracted light's k-vector in free-space.

For the MOT, in several embodiments, the three beams diffracted from the chip are required to each be orthogonal to one another. This can require that for each grating the diffraction angle relative to the surface normal equals 54.7° and the slabs spaced 120° apart from each other. The center of each grating emitter is placed on 3.5 mm circle to ensure the 9.45 mm intersection spot which enables enough clearance for waveplates and cell wall.

At the interface between the waveguide, which provides two-dimensional confinement, and the slab expander, which only provides confinement along one axis, the optical wave begins to diverge along the direction which is both transverse to its propagation and parallel to the chip's surface normal. This divergence can be represented mathematically as a spatially dependent distribution of optical k-vectors, given as:

$$k_x(x, y) = k_o\cos\left(\frac{y}{x}\right)$$

$$k_y(x, y) = k_o\sin\left(\frac{y}{x}\right)$$

In this expression, x and y are the coordinates within the nitride slab relative to the point at which the waveguide-to-slab transition occurs. This means that because the light is required to be emitted in a specific direction regardless of position, the grating coupler's k-vector must vary spatially to compensate for the varying components of the optical k-vector. This requirement may be represented mathematically as:

$$K_y = k_y = k_o\sin\left(\tan^{-1}\left(\frac{y}{x}\right)\right)$$

$$K_y = k_y - k_o\sin\left(\frac{y}{x}\right)$$

$$K_x = k_x - \frac{k_o\tan(54.7^o)}{\sqrt{1 + \tan(54.7^o)}}$$

Based on these local maps of grating period and direction a varying grating can be generated numerically. This can be done by beginning a single grating line at a chosen starting point and "walking forward", iteratively defining its movement and width. This process can be repeated for an arbitrary number of grating lines until the chosen grating area has been defined. In this way curved gratings which take slab mode and produce a flat intensity profile in free space can be generated. Gratings can be referred to as output coupling gratings. Output coupling gratings can communicate laser light to a target from a waveguide.

In several embodiments a grating length of 5.25 mm (which can correspond to a cross-sectional beam width of 2.5 mm) can be used. A grating etch depth required for an on-chip beam width of 5.25 mm can be around 2 nm in a 20 nm core. In several embodiments a 10 nm grating etch depth is used. This can beneficial to counteract a potential 20% etch depth variation. The grating coupling strength is lowest at the grating input and progressively increases as the light propagates in the grating region in accordance with embodiments of the invention. The grating period and duty cycle can be designed to progress from 0.8 um-0.08 um and 0%-50% from front to end of the grating respectively.

Figure 12:
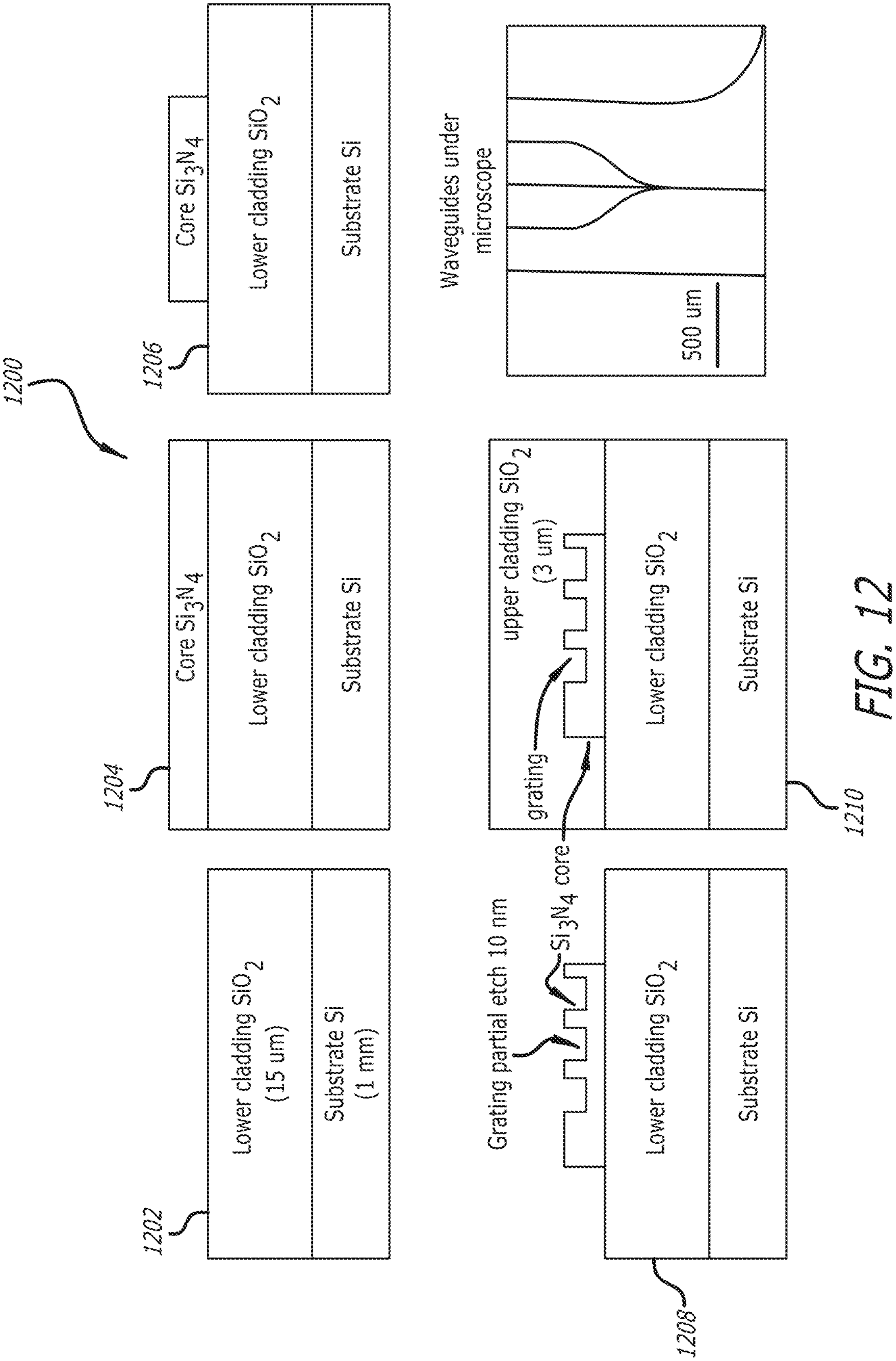
FIG. 12 conceptually illustrates an example fabrication process for a beam delivery device.

An example fabrication process for a beam delivery device (e.g., such as the mode expander and grating depicted in FIG. 11) is conceptually illustrated in FIG. 12. In various embodiments, fabrication processes are CMOS foundry compatible. The manufacturing process 1200 and starts (1202) with a 1 mm thick 100 mm (4-inch) diameter silicon wafer with 15 μm of thermal oxide. The waveguide core layer is made by depositing (1204) 120 nm of $Si_3N_4$ using Inductively Coupled Plasma-Plasma Enhanced Chemical Vapor Deposition (ICP-PECVD). Both the waveguide and grating layers are patterned (1206, 1208) using a standard 248 nm deep ultraviolet (DUV) stepper. Both layers are then etched with an Inductively Coupled Plasma-Reactive Ion Etcher (ICP-RIE). In several embodiments an optimized $CHF_3/CF_4/O_2$ etch chemistry with different plasma powers for the waveguide and grating etches is used. In some embodiments, the target etch depth for these gratings is 10 nm. ICP-PECVD can be used to deposit (1210) 3 μm of $SiO_2$ upper cladding. In several embodiments, the wafer is diced to access facets for fiber edge-coupling. The wafer is thoroughly cleaned following each etch step.

While specific methods and/or systems for photonic integrated circuits are described above, any of a variety of methods and/or systems can be utilized as a photonic integrated circuit as appropriate to the requirements of specific applications. In certain embodiments, steps and/or components may be performed and/or configured in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a photonic integrated circuit, the techniques disclosed herein may be used in any type of integrated optical system. The techniques disclosed herein may be used within any of the atomic clocks, magneto-optical trap, waveguides, and/or other components and/or systems as described herein.

As would be understood by one skilled in the art, the above integrated beamlines and functions can be used in applications other than MOTs, for example warm-vapor atomic sensors and optical clocks, magnetometers, While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A photonic integrated circuit with a beamline, the photonic integrated circuit comprising:

at least one laser with a first optical frequency related to a first at least one atomic transition, the at least one laser pre-stabilized to a at least one frequency reference, wherein the at least one laser is locked to the at least one frequency reference;

at least one photodiode and at least one feedback control circuit for locking the at least one laser to the at least one frequency reference;

at least one frequency shifter or laser frequency control for stabilizing the at least one laser to the frequency reference, and wherein the pre-stabilized laser is then locked to the at least one atomic transition; and at least one output coupling grating for communicating the at least laser to a target.

2. The photonic integrated circuit of claim 1, wherein the target is selected from a list consisting of an at least one atom in an atomic cell, an at least one ion in an ion trap, and a molecule in a vacuum cell.

3. The photonic integrated circuit of claim 1, wherein the frequency reference is selected from the group consisting of an atomic frequency reference and an optical cavity frequency reference.

4. The photonic integrated circuit of claim 1, wherein the output coupling grating is used can be used to form a lattice trap.

5. The photonic integrated circuit of claim 1, wherein the output coupling grating is used to form an optical tweezer.

6. The photonic integrated circuit of claim 1, further comprising a second output coupling grating and a third output coupling grating, wherein the at least one laser is coupled to the three output coupling gratings, and wherein the three output coupling gratings are arranged to intersect at a common point inside an atomic cell.

7. The photonic integrated circuit of claim 1, wherein the at least one laser is modulated to be locked to the at least one frequency reference.

8. The photonic integrated circuit of claim 1, wherein the target is selected from the group consisting of a vapor cell, an ion trap, a vacuum cell, 1D MOT, a 2D MOT, and a 3D MOT.

9. The photonic integrated circuit of claim 1, wherein the laser frequency is matched to a transition selected from the group including virtual atomic transitions multi-photon transitions, direct transitions, and indirect transitions.

10. The photonic integrated circuit of claim 1, wherein the laser optical frequency is selected from a list consisting of Deep UV, UV, near UV, Visible, Near IR, Mid IR and IR wavelengths.

11. The photonic integrated circuit of claim 1, wherein the at least one laser, photodiode, frequency shifter, and output coupling grating are integrated to an integrated circuit using a material selected from a group consisting of silicon nitride, tantalum pentoxide, alumina nitride, and alumina oxide.

12. The photonic integrated circuit of claim 1, wherein a quarter waveplate is located directly above each output coupling grating.

13. The photonic integrated circuit of claim 1, wherein the at least one output coupling grating is configured to emit polarization selected from the group consisting of circular polarization, elliptical polarization and engineered degrees of polarization.

14. The photonic integrated circuit of claim 1, wherein the at least one output coupling grating is configured to emit intensity profiles selected from the group consisting of flat top, gaussian, and engineered intensity profiles.

15. The photonic integrated circuit of claim 1, wherein the photonic integrated circuit is CMOS foundry compatible $Si_3N_4$ waveguide circuit, and wherein during manufacturing a set of relative positions of the output coupling gratings are fixed.

16. The photonic integrated circuit of claim 1, further comprising a repump laser and a cooling laser, and wherein the repump laser and the cooling laser are locked to a second frequency reference and a third frequency reference respectively.

17. The photonic integrated circuit of claim 16, wherein the repump laser, cooling laser, and at least one laser are output from a common output coupling grating.

18. A photonic integrated circuit forming part of an ion trap, the photonic integrated circuit comprising:

at least one laser with an optical frequency matched to at least one atomic transition, the at least one laser pre-stabilized to the at least one atomic transition, wherein pre-stabilization of the laser to the at least one atomic transition uses at least one frequency reference, wherein the at least one laser is modulated for locking to the at least frequency reference, and wherein the at least one laser is modulated for locking to the at least one atomic transition; and at least one photodiode and at least one feedback control circuit for locking the at least one laser to the at least one frequency reference.

19. A photonic integrated circuit forming part of a molecular trap, the photonic integrated circuit comprising:

at least one laser with an optical frequency matched to at least one atomic transition, the at least one laser pre-stabilized to the at least one atomic transition, wherein pre-stabilization of the laser to the at least one atomic transition uses at least one frequency reference, wherein the at least one laser is modulated for locking to the at least frequency reference, and wherein the at least one laser is modulated for locking to the at least one atomic transition;

at least one photodiode and at least one feedback control circuit for locking the at least one laser to the at least one frequency reference; and three output coupling gratings, wherein the three output coupling gratings are mounted on a photonic integrated circuit around a circumference with a spacing of around 120 degrees, and wherein each grating emitter is etched to emit free-space beams at a selected angle, wherein the selected angle results in a set of free-space beams intersecting at a location inside an atomic cell.

20. The photonic integrated circuit of claim 19, wherein the circumference and the selected angle are such that all the free-space beams from the three output coupling gratings enter the atomic cell through at least one wall of the atomic cell.

* * * * *